United States Patent
Zhang et al.

(10) Patent No.: US 12,075,390 B2
(45) Date of Patent: Aug. 27, 2024

(54) TRANSMISSION RESOURCE DETERMINING METHOD AND APPARATUS

(71) Applicant: HUAWEI TECHNOLOGIES CO., LTD., Shenzhen (CN)

(72) Inventors: Jinfang Zhang, Shenzhen (CN); Hongjia Su, Shanghai (CN); Zhengzheng Xiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 471 days.

(21) Appl. No.: 17/391,182

(22) Filed: Aug. 2, 2021

(65) Prior Publication Data

US 2021/0360624 A1 Nov. 18, 2021

Related U.S. Application Data

(63) Continuation of application No. PCT/CN2020/073782, filed on Jan. 22, 2020.

(30) Foreign Application Priority Data

Feb. 2, 2019 (CN) .......................... 201910107341.1

(51) Int. Cl.
*H04W 72/04* (2023.01)
*H04L 1/18* (2023.01)
(Continued)

(52) U.S. Cl.
CPC ....... *H04W 72/0446* (2013.01); *H04L 1/1896* (2013.01); *H04W 72/20* (2023.01); *H04W 72/56* (2023.01); *H04W 92/18* (2013.01)

(58) Field of Classification Search
CPC ... H04W 28/04; H04W 72/04; H04W 72/042; H04W 88/08; H04W 72/0446;
(Continued)

(56) References Cited

U.S. PATENT DOCUMENTS

| 11,617,162 B2 * | 3/2023 | Kwak ................... H04W 72/02 370/329 |
| 11,627,556 B2 * | 4/2023 | Lee ...................... H04L 1/1812 370/329 |

(Continued)

FOREIGN PATENT DOCUMENTS

| CN | 106559130 A | 4/2017 |
| CN | 108811120 A | 11/2018 |

(Continued)

OTHER PUBLICATIONS

3GPP TSG RAN WG1 Meeting #95, Spokane, USA, Nov. 12-16, 2018, R1-1813554, Agenda item: 7.2.4.1.5, Source: Huawei, HiSilicon, Title: Design and contents of PSCCH and PSFCH. (Year: 2018).*

(Continued)

*Primary Examiner* — Peter G Solinsky
*Assistant Examiner* — Sanjay K Dewan
(74) *Attorney, Agent, or Firm* — Maier & Maier, PLLC

(57) ABSTRACT

An exemplary embodiment provides a transmission resource determining method and apparatus. A first terminal device obtains a slot format corresponding to at least one other terminal device in a first slot, where the slot format includes a first slot format and/or a second slot format; symbols used for sending information and receiving information in the first slot format are inconsistent with those in the second slot format. The first terminal device determines, based on the slot format corresponding to the at least one other terminal device in the first slot, a slot format corresponding to the first terminal device in the first slot. This may be applied to an Internet of Vehicles, for example, V2X, LTE-V, and V2V.

16 Claims, 9 Drawing Sheets

(51) Int. Cl.
*H04L 1/1867* (2023.01)
*H04W 72/0446* (2023.01)
*H04W 72/10* (2009.01)
*H04W 72/20* (2023.01)
*H04W 72/56* (2023.01)
*H04W 92/18* (2009.01)

(58) Field of Classification Search
CPC ..... H04W 72/56; H04W 72/20; H04W 72/10; H04W 72/0406; H04L 5/0007; H04L 1/1896
USPC .......................................................... 370/329
See application file for complete search history.

(56) References Cited

U.S. PATENT DOCUMENTS

| | | | | |
|---|---|---|---|---|
| 11,638,292 | B2* | 4/2023 | Lee | H04L 1/08 |
| | | | | 370/329 |
| 11,659,531 | B2* | 5/2023 | Lei | H04L 1/1896 |
| | | | | 370/329 |
| 11,758,530 | B2* | 9/2023 | Ly | H04L 5/0044 |
| | | | | 370/329 |
| 11,758,543 | B2* | 9/2023 | Chae | H04W 72/23 |
| | | | | 370/329 |
| 11,765,690 | B2* | 9/2023 | Huang | H04B 7/0456 |
| | | | | 370/329 |
| 11,777,671 | B2* | 10/2023 | Sundararajan | H04L 5/0044 |
| | | | | 370/329 |
| 11,792,784 | B2* | 10/2023 | Fong | H04W 72/25 |
| | | | | 370/329 |
| 2009/0175232 | A1* | 7/2009 | Kolding | H04L 1/0027 |
| | | | | 370/329 |
| 2011/0249634 | A1* | 10/2011 | Lee | H04W 72/20 |
| | | | | 370/329 |
| 2018/0132270 | A1* | 5/2018 | Zeng | H04L 1/1887 |
| 2018/0167965 | A1* | 6/2018 | Wang | H04L 5/0044 |
| 2018/0219654 | A1* | 8/2018 | Chen | H04L 5/16 |
| 2018/0278402 | A1* | 9/2018 | Zeng | H04L 1/1664 |
| 2018/0367289 | A1* | 12/2018 | Kim | H04L 5/0092 |
| 2019/0053227 | A1* | 2/2019 | Huang | H04L 25/03006 |
| 2022/0140951 | A1* | 5/2022 | He | H04L 1/1819 |
| | | | | 370/329 |
| 2022/0141846 | A1* | 5/2022 | Lee | H04W 72/569 |
| | | | | 370/329 |
| 2023/0080625 | A1* | 3/2023 | Dutta | H04B 7/0404 |
| | | | | 370/329 |
| 2023/0084917 | A1* | 3/2023 | Li | H04W 28/0215 |
| | | | | 370/329 |
| 2023/0127780 | A1* | 4/2023 | Lee | H04W 52/0216 |
| | | | | 370/329 |
| 2023/0269747 | A1* | 8/2023 | Ang | H04W 24/08 |
| | | | | 370/329 |
| 2023/0319787 | A1* | 10/2023 | Cozzo | H04W 72/0453 |
| | | | | 370/329 |

FOREIGN PATENT DOCUMENTS

| | | | | |
|---|---|---|---|---|
| CN | 109121209 A | * | 1/2019 | ........... H04W 72/04 |
| CN | 109152003 A | | 1/2019 | |
| CN | 109219937 A | | 1/2019 | |

OTHER PUBLICATIONS

3GPP TSG RAN WG1 Ad-Hoc Meeting 1901, Taipei, Jan. 21-25, 2019, R1-1900856, Agenda Item: 7.2.4.1.5, Source: Huawei, HiSilicon, Title: Frame and slot structure for sidelink. (Year: 2019).*
3GPP TSG-RAN WG1 #90, Prague, Czech Republic, Aug. 21-25, 2017, R1-1714063, Agenda item: 6.1.3.1.4.2, Source: Nokia, Nokia Shanghai Bell, Title: On the slot format related information on group-common PDCCH in NR. (Year: 2017).*
3GPP TSG RAN WG1 Meeting #95, Spokane, USA, Nov. 12-16, 2018, R1-1812206, Agenda item: 7.2.4.1.1, Source: Huawei, HiSilicon, Title: Sidelink physical layer structure for NR V2X. (Year: 2018).*
Huawei, Hisilicon, Design and contents of PSCCH and PSFCH, 3GPP TSG RAN WG1 Meeting #95, Spokane, USA, Nov. 12-16, 2018, R1-1813554, 7 pages.
Huawei et al: "Frame and slot structure for sidelink", 3GPP TSG RAN WG1 Ad-Hoc Meeting 1901; R1-1900856, Jan. 20, 2019, XP051593702, total 5 pages.
Nokia et al: "On the slot format related information on group-common PDCCH in NR", 3GPP TSG-RAN WG1#90; R1-1714063, Aug. 20, 2017, XP051316855, total 3 pages.
Huawei et al., "Sidelink physical layer structure for NR V2X", 3GPP TSG RAN WG1 Meeting #95, Spokane, USA, Nov. 12-16, 2018, R1-1812206, 12 pages.

* cited by examiner

FIG. 7

TRANSMISSION RESOURCE DETERMINING METHOD AND APPARATUS

CROSS-REFERENCE TO RELATED APPLICATIONS

This application is a continuation of International Application No. PCT/CN2020/073782, filed on Jan. 22, 2020, which claims priority to Chinese Patent Application No. 201910107341.1, filed on Feb. 2, 2019. The disclosures of the aforementioned applications are hereby incorporated by reference in their entireties.

TECHNICAL FIELD

An exemplary embodiment relates to the communication field, and to a transmission resource determining method and apparatus.

BACKGROUND

In a wireless network, when a base station communicates with a terminal device, the base station configures a slot format on an uplink or a downlink, for example, which symbols in a slot are available, or which symbols in a slot are uplink symbols, or which symbols in a slot are downlink symbols. In other words, when data sending and receiving is performed between the base station and the terminal device, the slot format on the uplink or the downlink is known to the base station and the terminal device.

A sidelink is defined for direct communication between terminal devices. In other words, the terminal devices directly communicate with each other without forwarding by a base station. When communication is performed between the terminal devices, there may be a plurality of slot formats in a system. In other words, different terminal devices in the system may use different slot formats to transmit information. Consequently, data receiving of a receiver device is affected, and a success rate of receiving data by the receiver terminal device is low.

SUMMARY

An exemplary embodiment provides a transmission resource determining method and apparatus, to improve a transmission success rate of transmitting data and/or feedback information.

According to a first aspect, a transmission resource determining method is provided. The method includes: obtaining, by a first terminal device, a slot format corresponding to at least one other terminal device in a first slot, where the slot format includes a first slot format and a second slot format: a second terminal device is any one of the at least one other terminal device, and the first slot format corresponding to the second terminal device in the first slot includes: all of symbols that can be used for transmission in the first slot are used by the second terminal device to send information: the second slot format corresponding to the second terminal device in the first slot includes: P symbols in the symbols that can be used for transmission in the first slot are used by the second terminal device to send information, N symbols are used by the second terminal device to receive information, $8 \le P \le 11$, $1 \le N \le 2$, and P and N are both positive integers: and determining, by the first terminal device based on the slot format corresponding to the at least one other terminal device in the first slot, a slot format corresponding to the first terminal device in the first slot.

The first terminal device determines, based on the slot format corresponding to the at least one other terminal device in the first slot, the slot format corresponding to the first terminal device in the first slot, so that when communication is performed between the terminal devices, the terminal devices do not affect each other, thereby improving a success rate of transmitting information between the terminal devices.

With reference to the first aspect, in a possible implementation, the determining, by the first terminal device based on the slot format corresponding to the at least one other terminal device in the first slot, a slot format corresponding to the first terminal device in the first slot includes: when the slot format corresponding to the at least one other terminal device in the first slot includes the second slot format, and the first terminal device needs to send information, determining that the slot format corresponding to the first terminal device in the first slot is the second slot format, where P symbols in symbols that can be used for transmission in the second slot format are used by the first terminal device to send information, and N symbols in the symbols that can be used for transmission are used by the first terminal device to receive feedback information.

With reference to the first aspect, in a possible implementation, the determining, by the first terminal device based on the slot format corresponding to the at least one other terminal device in the first slot, a slot format corresponding to the first terminal device in the first slot includes: when the slot format corresponding to the at least one other terminal device in the first slot includes only the first slot format, and the first terminal device needs to send information, determining that the slot format corresponding to the first terminal device in the first slot is the first slot format, where all of symbols that can be used for transmission in the first slot format are used by the first terminal device to send information.

When the first terminal device needs to send information, and the at least one other terminal device uses the second slot format in the first slot, the first terminal device correspondingly also uses the second slot format, so that impact on receiving data by a receiver terminal device on a corresponding symbol in the first slot can be avoided, and the transmission success rate of transmitting information between the terminal devices can be improved.

With reference to the first aspect, in a possible implementation, the determining, by the first terminal device based on the slot format corresponding to the at least one other terminal device in the first slot, a slot format corresponding to the first terminal device in the first slot includes: when the slot format corresponding to the at least one other terminal device in the first slot includes the first slot format and the second slot format, and the first terminal device needs to receive information, determining, by the first terminal device, a priority of receiving feedback information and a priority of receiving data: and when the priority of receiving feedback information is higher than the priority of receiving data, determining that the slot format corresponding to the first terminal device in the first slot is the second slot format, where P symbols in symbols that can be used for transmission in the second slot format are used by the first terminal device to receive data, and N symbols are used by the first terminal device to send feedback information.

When the first terminal device needs to send information, and the at least one other terminal device uses the first slot format in the first slot, the first terminal device correspondingly also uses the first slot format, so that impact on receiving data by a receiver terminal device on a corresponding symbol in the first slot can be avoided, and the transmission success rate of transmitting information between the terminal devices can be improved.

With reference to the first aspect, in a possible implementation, the determining, by the first terminal device based on the slot format corresponding to the at least one other terminal device in the first slot, a slot format corresponding to the first terminal device in the first slot includes: when the priority of receiving information in the first slot format is not higher than the priority of receiving information in the second slot format, determining, by the first terminal device, that the slot format corresponding to the first terminal device in the first slot is the second slot format, where the P symbols in the symbols that can be used for transmission in the second slot format are used by the first terminal device to receive data, and the N symbols are used by the first terminal device to send feedback information: or when the priority of receiving information in the first slot format is higher than the priority of receiving information in the second slot format, determining, by the first terminal device, that the slot format corresponding to the first terminal device in the first slot is the first slot format, where all of symbols that can be used for transmission in the first slot format are used by the second terminal device to receive information, or P symbols in symbols that can be used for transmission are used by the first terminal device to receive data, and N symbols are used by the first terminal device to receive feedback information.

When the first terminal device needs to receive information, and the first terminal device determines that the priority of receiving feedback information by the at least one other terminal device in the first slot is higher than the priority of receiving data by the at least one other terminal device in the first slot, the first terminal device preferentially uses the second slot format to receive information, so that the transmission success rate of transmitting data and/or feedback information between the terminal devices can be improved.

With reference to the first aspect, in a possible implementation, the obtaining, by a first terminal device, a slot format corresponding to at least one other terminal device in a first slot includes: detecting, by the first terminal device in a second slot, sidelink control information (SCI) sent by each of the at least one other terminal device, where the SCI is used to indicate a slot format corresponding to the at least one other terminal device in the second slot, and the second slot is earlier than the first slot: and/or receiving, by the first terminal device, configuration information sent by a base station, where the configuration information is used to indicate the slot format corresponding to the at least one other terminal device in the first slot.

When the first terminal device needs to receive information, and the first terminal device determines priorities of the first slot format and the second slot format of the at least one other terminal device, the first terminal device correspondingly uses a slot format with a higher priority to transmit information, so that the transmission success rate of transmitting information between the terminal devices can be improved.

With reference to the first aspect, in a possible implementation, the SCI includes resource reservation information, where the resource reservation information is used to indicate the slot format used by the at least one other terminal device in the first slot: or information about a repeated transmission time interval, where the first terminal device determines, based on information about the repeated transmission time interval, a time interval at which the at least one other terminal device continuously and repeatedly transmits data in the first slot by using the slot format the same as that in the second slot.

With reference to the first aspect, in a possible implementation, the SCI further includes feedback information symbol indication information, where the feedback information symbol indication information is used to indicate a symbol for sending feedback information.

The first terminal device obtains, in the second slot earlier than the first slot, the slot format used by the at least one other terminal device, so that the slot format used by the first terminal device in the first slot can be determined before the first slot, thereby improving a transmission rate of transmitting data and/or feedback information.

According to a second aspect, a transmission resource determining apparatus is provided. The apparatus includes a processor and a transceiver, where the transceiver is configured to obtain a slot format corresponding to at least one other terminal device in a first slot, and the slot format includes a first slot format and a second slot format: a second terminal device is any one of the at least one other terminal device, and the first slot format corresponding to the second terminal device in the first slot includes: all of symbols that can be used for transmission in the first slot are used by the second terminal device to send information: the second slot format corresponding to the second terminal device in the first slot includes: P symbols in the symbols that can be used for transmission in the first slot are used by the second terminal device to send information, N symbols are used by the second terminal device to receive information, $8 \leq P \leq 11$, $1 \leq N \leq 2$, and P and N are both positive integers: and the processor is configured to determine, based on the slot format corresponding to the at least one other terminal device in the first slot, a slot format corresponding to the apparatus in the first slot.

With reference to the second aspect, in a possible implementation, that the processor determines, based on the slot format corresponding to the at least one other terminal device in the first slot, a slot format corresponding to the apparatus in the first slot includes: when the slot format corresponding to the at least one other terminal device in the first slot includes the second slot format, and the transceiver needs to send information, determining that the slot format corresponding to the apparatus in the first slot is the second slot format, where P symbols in symbols that can be used for transmission in the second slot format are used by the apparatus to send information, and N symbols are used by the apparatus to receive feedback information.

With reference to the second aspect, in a possible implementation, that the processor determines, based on the slot format corresponding to the at least one other terminal device in the first slot, a slot format corresponding to the apparatus in the first slot includes: when the slot format corresponding to the at least one other terminal device in the first slot includes only the first slot format, and the transceiver needs to send information, determining that the slot format corresponding to the apparatus in the first slot is the first slot format, where all of symbols that can be used for transmission in the first slot format are used by the apparatus to send information.

With reference to the second aspect, in a possible implementation, that the processor determines, based on the slot format corresponding to the at least one other terminal device in the first slot, a slot format corresponding to the apparatus in the first slot includes: when the slot format corresponding to the at least one other terminal device in the first slot includes the first slot format and the second slot format, and the transceiver needs to receive information, determining, by the processor, a priority of receiving feedback information and a priority of receiving data: and when the priority of receiving feedback information is higher than the priority of receiving data, determining that the slot format corresponding to the apparatus in the first slot is the second slot format, where P symbols in symbols that can be used for transmission in the second slot format are used by the apparatus to receive data, and N symbols are used by the apparatus to send feedback information.

With reference to the second aspect, in a possible implementation, that the processor determines, based on the slot format corresponding to the at least one other terminal device in the first slot, a slot format corresponding to the apparatus in the first slot includes: when the priority of receiving information in the first slot format is not higher than the priority of receiving information in the second slot format, determining, by the processor, that the slot format corresponding to the apparatus in the first slot is the second slot format, where the P symbols in the symbols that can be used for transmission in the second slot format are used by the apparatus to receive data, and the N symbols are used by the apparatus to send feedback information: or when the priority of receiving information in the first slot format is higher than the priority of receiving information in the second slot format, determining, by the processor, that the slot format corresponding to the apparatus in the first slot is the first slot format, where all of symbols that can be used for transmission in the first slot format are used by the apparatus to receive information, or P symbols in symbols that can be used for transmission are used by the apparatus to receive data, and N symbols are used by the apparatus to receive feedback information.

With reference to the second aspect, in a possible implementation, that the transceiver obtains a slot format corresponding to at least one other terminal device in a first slot includes: detecting, by the transceiver in a second slot, SCI sent by each of the at least one other terminal device, where the SCI is used to indicate a slot format corresponding to the at least one other terminal device in the second slot, and the second slot is earlier than the first slot: and/or receiving, by the transceiver, configuration information sent by a base station, where the configuration information is used to indicate the slot format corresponding to the at least one other terminal device in the first slot.

With reference to the second aspect, in a possible implementation, the SCI includes resource reservation information, where the resource reservation information is used to indicate the slot format used by the at least one other terminal device in the first slot: or information about a repeated transmission time interval, where the processor determines, based on information about the repeated transmission time interval, a time interval at which the at least one other terminal device continuously and repeatedly transmits data in the first slot by using the slot format the same as that in the second slot.

With reference to the second aspect, in a possible implementation, the SCI further includes feedback information symbol indication information, where the feedback information symbol indication information is used to indicate a symbol for sending feedback information.

According to a third aspect, a storage medium is provided. The storage medium stores a computer program or instructions. When the computer program is executed or the instructions are executed, a computer is enabled to perform the method in any possible implementation of the first aspect.

According to a fourth aspect, a communication apparatus is provided. The communication apparatus includes a processor and a memory, where the processor reads and executes instructions in the memory, to implement the method in any possible implementation of the first aspect.

According to a fifth aspect, a communication system is provided. The communication system includes an apparatus for implementing the method in any possible implementation of the first aspect.

BRIEF DESCRIPTION OF DRAWINGS

FIG. 7 is a schematic diagram of an exemplary self-contained slot format according to an embodiment:

DESCRIPTION OF EMBODIMENTS

Figure 1:
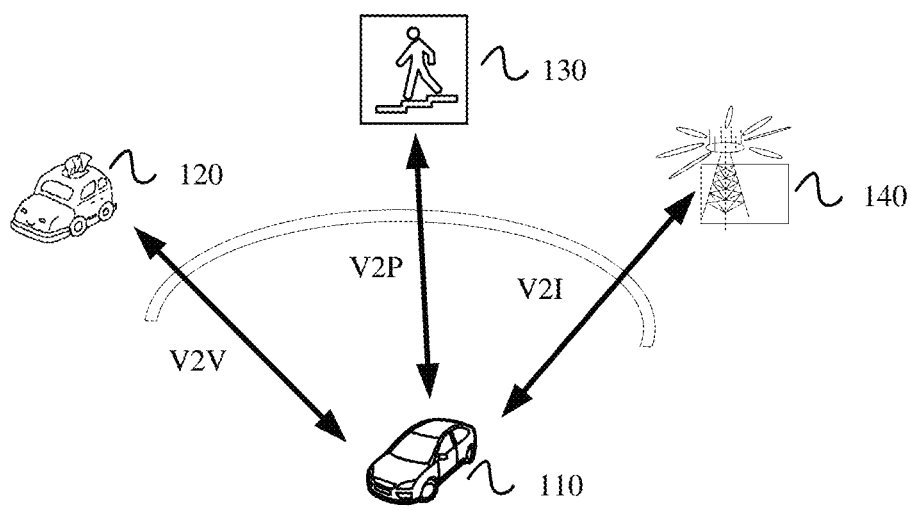
FIG. 1 is a schematic diagram of a V2X communication scenario.

The following describes technical solutions with reference to the accompanying drawings.

The technical solutions in the embodiments may be applied to various communication systems, such as a global system for mobile communications (GSM) system, a code division multiple access (CDMA) system, a wideband code division multiple access (WCDMA) system, a general packet radio service system, a long term evolution (LTE) system, an LTE frequency division duplex system, an LTE time division duplex system, a universal mobile telecommunications system, a worldwide interoperability for microwave access communication system, and a future 5th generation (5G) system or new radio (NR) system.

It should be understood that a network device in the communication system may be any device that has a wireless transceiver function. The network device includes but is not limited to an evolved NodeB (eNB or eNodeB), a radio network controller, a NodeB (Node B, NB), a base station controller, a base transceiver station, a home base station (for example, a home evolved NodeB, or a home Node B, HNB), a baseband unit, an access point in a wireless fidelity (Wi-Fi) system, a wireless relay node, a wireless backhaul node, a transmission point, a transmission reception point, or the like. Alternatively, the network device may be a 5G Node B (gNB) or a transmission point in a 5G system such as an NR system, may be one antenna panel or a group (including a plurality of antenna panels) of antenna panels of a base station in a 5G system, or may be a network node, such as a baseband unit or a distributed unit, that constitutes a gNB or a transmission point.

In some deployments, the gNB may include a centralized unit and a distributed unit. The gNB may further include a radio frequency unit. The centralized unit implements some functions of the gNB, and the distributed unit implements some functions of the gNB. For example, the centralized unit implements functions of a radio resource control (RRC) layer and a packet data convergence protocol layer, and the distributed unit implements functions of a radio link control layer, a media access control layer, and a physical layer. Information at the RRC layer finally becomes information at the physical layer or is transformed from information at the physical layer. Therefore, in such an architecture, it may be considered that higher layer signaling such as RRC layer signaling is sent by the distributed unit or is sent by the distributed unit and the centralized unit. It may be understood that the network device may be a centralized unit node, a distributed unit node, or a device including a centralized unit node and a distributed unit node. In addition, the centralized unit may be classified as a network device in an access network, or the centralized unit may be classified as a network device in a core network. This is not limited in the embodiments.

A terminal device in the embodiments may be user equipment (UE), an access terminal, a subscriber unit, a subscriber station, a mobile station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol phone, a wireless local loop station, a personal digital assistant, a handheld device or a computing device having a wireless communication function, another processing device connected to a wireless modem, a vehicle-mounted device, a wearable device, a terminal device in a future 5G network, or a terminal device in a future evolved public land mobile network. This is not limited in the embodiments.

In addition, the terminal device in the embodiments may alternatively be a terminal device in an internet of things (IoT) system. An IoT is an important part of future development of information technologies. A main technical feature of the IoT is connecting a thing to a network by using a communication technology, to implement an intelligent network for interconnection between a person and a machine or between things.

In the embodiments, an IoT technology can implement massive connections, deep coverage, and terminal power saving by using, for example, a narrowband (narrow band) technology. For example, narrow band includes only one resource block. In other words, a bandwidth of the narrow band is only 180 KB. To implement massive access, terminals are required to be discrete in access. According to a communication method in the embodiments, a congestion problem that occurs when massive terminals access a network through the narrow band in the IoT technology can be effectively resolved.

In the embodiments, the network device may be a device configured to communicate with the terminal device. The network device may be a BTS in a GSM system or a CDMA system, may be a NodeB in a WCDMA system, may be an eNB in an LTE system, or may be a radio controller in a scenario of a cloud radio access network. Alternatively, the network device may be a relay node, an access point, a vehicle-mounted device, a wearable device, a network device in a future 5G network, a network device in a future evolved public land mobile network, or the like, may be an access point in a WLAN, or may be a gNB in an NR system. This is not limited in the embodiments.

In addition, in the embodiments, the network device serves a cell. The terminal device communicates with an access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, a concept of the carrier may be considered equivalent to that of the cell. For example, in a carrier aggregation scenario, when a secondary carrier is configured for the terminal device, both a carrier index of the secondary carrier and a cell identity (cell identification, Cell ID) of a secondary cell working on the secondary carrier are carried. In this case, it may be considered that the concept of the carrier is equivalent to the concept of the cell. For example, that the terminal device accesses a carrier is equivalent to that the terminal device accesses a cell.

A core network device may be connected to a plurality of access network devices, and is configured to control the access network devices. In addition, the core network device may distribute, to the access network devices, data received from a network side (for example, the internet).

The foregoing listed functions and exemplary implementations of the terminal device, the access network device, and the core network device are merely described by way of example, and this is not limited in the exemplary embodiments.

In the embodiments, the terminal device or the network device includes a hardware layer, an operating system layer running on the hardware layer, and an application layer running on the operating system layer. The hardware layer includes hardware such as a central processing unit (CPU), a memory management unit, and a memory (which is also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, an exemplary structure of an execution body of a method provided in the embodiments is not specifically limited in the embodiments, provided that a program that records code of the method provided in the embodiments can be run to perform communication according to the method provided in the embodiments. For example, the method provided in the embodiments may be performed by the terminal device or the network device, or a function module that is in the terminal device or the network device and that can invoke and execute the program.

An internet of vehicles technology based on a cellular network interconnects vehicles through a vehicle-to-everything (vehicle to X, V2X) communication system. The V2X communication system provides vehicle-to-vehicle (V2V), vehicle-to-pedestrian (V2P), vehicle-to-infrastructure (V2I), and vehicle-to-network (V2N) intelligent transportation services. Uplinks and downlinks are used for V2N communication, but sidelinks are used for V2V, V2I, and V2P data communication. A sidelink is defined for direct communication between terminal devices. In other words, the terminal devices may directly communicate with each other without forwarding by a base station. The terminal device herein may be an in-vehicle communication module or a communication terminal, a handheld communication terminal, or a road side unit.

FIG. 1 shows a V2X communication scenario. As shown in FIG. 1, when V2V communication is performed between a vehicle 110 and a vehicle 120, the vehicle may broadcast, to a surrounding vehicle, information such as a vehicle speed, a driving direction, a specific location, and whether an emergency brake is pressed. After obtaining the information, a driver of the surrounding vehicle can better perceive a traffic condition beyond a line of sight, to foresee and avoid a dangerous condition. When V2I communication is performed between the vehicle 110 and an infrastructure 140, in addition to exchanges of the foregoing security information, the roadside infrastructure 140, for example, a roadside unit, may further provide various types of service information and data network access for the vehicle, for example, electronic toll collection and in-vehicle entertainment. These functions greatly improve traffic intelligence. When V2P communication is performed between the vehicle 110 and a person 130, the vehicle 110 may provide a real-time location of the vehicle 110, a road condition, and the like to a pedestrian nearby, so that a real-time road condition is provided for the person nearby and the person nearby takes a corresponding measure.

It should be understood that, for ease of description, FIG. 1 shows only communication between individual vehicles, between an individual pedestrian and an individual vehicle, and between an individual vehicle and an individual infrastructure. This is not limited in the embodiments. For example, in an internet of vehicles system, there may be more vehicles. This is not limited in the exemplary embodiments.

Figure 2:
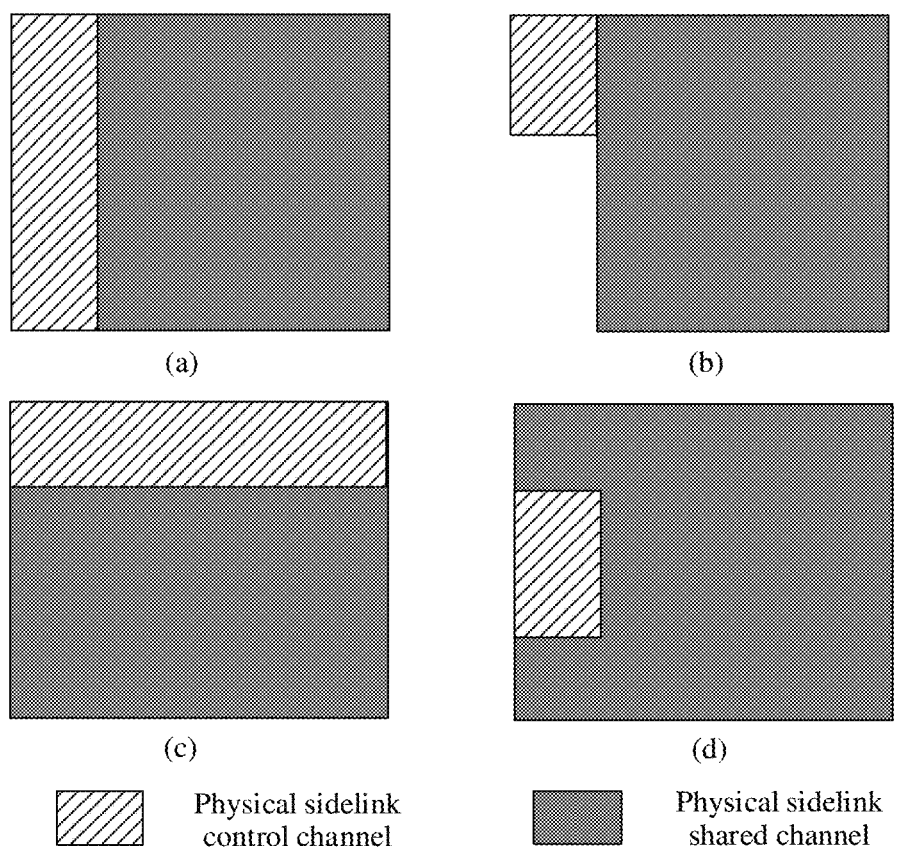
FIG. 2 is a schematic diagram of multiplexing modes of a PSCCH and a PSSCH.

A time-frequency resource used for sidelink communication may be determined from a resource pool. Simply, for the resource pool, all available resources are considered as a whole. The resource pool includes a set of time domain resources and frequency domain resources. In an exemplary embodiment, for a time domain resource, different time granularities such as a frame, a subframe, a slot, a mini-slot, and a symbol may be used. For a frequency domain resource, a minimum granularity may be a resource block, or may be a sub-channel. The sub-channel may include a specific quantity of resource blocks. Using the sub-channel as an example, one sidelink transmission may occupy one or more sub-channels, to transmit sidelink scheduling assignment or SCI and user data. For example, the control information may be transmitted through a physical layer sidelink control channel (physical sidelink control channel, PSCCH). For another example, the user data may be transmitted through a physical layer sidelink shared channel (physical sidelink shared channel, PSSCH). As shown in FIG. 2, the PSCCH and the PSSCH may be time division multiplexed, frequency division multiplexed, or time-frequency division multiplexed. In FIG. 2, an upper left corner diagram (a) and an upper right corner diagram (b) are in a time division mode. In the upper left corner diagram (a) in FIG. 2, a frequency domain bandwidth of the PSCCH is the same as that of the PSSCH. In the upper right corner diagram (b) in FIG. 2, the frequency domain bandwidth of the PSCCH may be different from that of the PSSCH. In FIG. 2, a lower left corner diagram (c) is in a frequency division mode and a lower right corner diagram (d) is in a time-frequency division mode, that is, the PSCCH and the PSSCH are respectively multiplexed in time and frequency.

Figure 3:
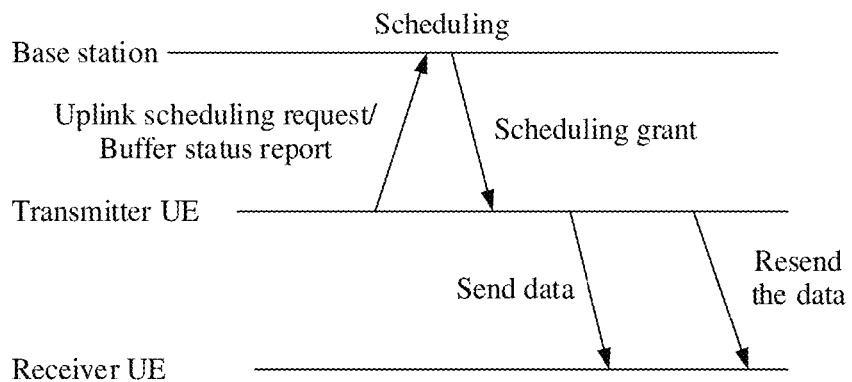
FIG. 3 is a schematic diagram of a scheduling transmission mode in LTE V2X.

LTE V2X sidelink communication includes two communication modes. A first communication mode is sidelink communication based on scheduling performed by a base station. A terminal device sends, on a scheduled time-frequency resource, control information and data of the sidelink communication based on scheduling information of the base station. This communication mode is referred to as a scheduling transmission mode or a mode 3 in LTE V2X. In a second communication mode, a terminal device selects, from available time-frequency resources included in sidelink communication resources, a time-frequency resource used for communication, and sends control information and data on the selected time-frequency resource. This communication mode is referred to as a non-scheduling transmission mode or a mode 4 in LTE V2X. It should be noted that, in a scheduling transmission mode of sidelink communication, only control information is exchanged between the base station and the terminal device through a Uu interface, but user data is not sent or received between the base station and the terminal device. The Uu interface indicates a communication interface between the terminal device and the base station device. The scheduling transmission mode in the LTE V2X is shown in FIG. 3. In FIG. 3, a transmitter terminal device sends a scheduling request or a buffer status report to a base station, to request the base station to allocate a resource to sidelink transmission. After allocating the corresponding resource to the sidelink transmission, the base station delivers, to the transmitter terminal device, a scheduled time-frequency resource for sidelink transmission. The transmitter terminal device sends sidelink user data on the allocated sidelink transmission resource. It should be noted that the transmitter terminal device may send one data packet once or for a plurality of times on a sidelink. For example, it is defined in the LTE V2X that one data packet can be repeatedly sent for a maximum of two times. In this case, the base station may allocate a time-frequency resource for a plurality of sidelink transmissions during one scheduling. For example, as shown in FIG. 3, the base station schedules, for the transmitter terminal device, a time-frequency resource repeatedly sent twice.

NR sidelink communication mode may also include two communication modes: a mode 1 and a mode 2, which correspond to a mode 3 and a mode 4 in the LTE V2X. In the mode 3 communication mode, a network device performs resource scheduling or configuration. In the mode 4 communication mode, the terminal device itself or another terminal device assists in resource scheduling or configuration. In an exemplary embodiment, each mode further includes several sub-modes. For example, the mode 1 includes sidelink communication based on dynamic scheduling performed by the base station. In this case, a time-frequency resource used for sidelink transmission each time is scheduled by the base station and delivered to the transmitter terminal device. The mode 1 further includes configuration-based semi-persistent scheduling. In this case, a time-frequency resource used for sidelink transmission is configured by the base station, and activated by using scheduling signaling delivered by the base station when the time-frequency resource is used and deactivated by using the scheduling signaling delivered by the base station when the time-frequency resource is not used. The mode 1 further includes configuration-based grant-free sidelink communication. In this case, a time-frequency resource used for sidelink transmission is preconfigured by the base station and may be directly used without activation. The mode 2 includes terminal device-assisted scheduling. In this case, a receiver terminal device may feed back, to the transmitter terminal device, information such as interference, to assist the transmitter terminal device in scheduling a time-frequency resource. The mode 2 further includes configuration-based grant-free sidelink transmission. In this case, a time-frequency resource used for sidelink transmission is configured or preconfigured by the base station. The mode 2 further includes sensing-based sidelink transmission. In this case, the transmitter terminal device selects, by sensing an available time-frequency resource in a sending resource pool, a time-frequency resource used for sidelink transmission. The mode 2 further includes sidelink transmission based on scheduling performed by another terminal device. In this case, one terminal device is used for resource scheduling for sidelink transmission of the another terminal device, and a time-frequency resource for sidelink transmission is scheduled by the terminal device.

When there is data to be sent, the terminal device sends data based on an available resource that is scheduled, configured, or sensed. When there is no data to be sent, the terminal device is in a receiving state, and the terminal device may receive data transmission on all configured receiving resource pools. The transmission modes, namely, the LTE mode 4 and the NR mode 2 are mainly transmission scheduled by the distributed terminal device, that is, the terminal device itself selects a time-frequency resource for data sending.

The method provided in the embodiments may be applied to a sidelink communication system that is based on the LTE mode 4 transmission mode and/or the NR mode 2 transmission mode, or may be applied to a sidelink communication system that is based on the LTE mode 3 transmission mode and/or the NR mode 1 transmission mode. This is not limited in the exemplary embodiments.

Figure 4:
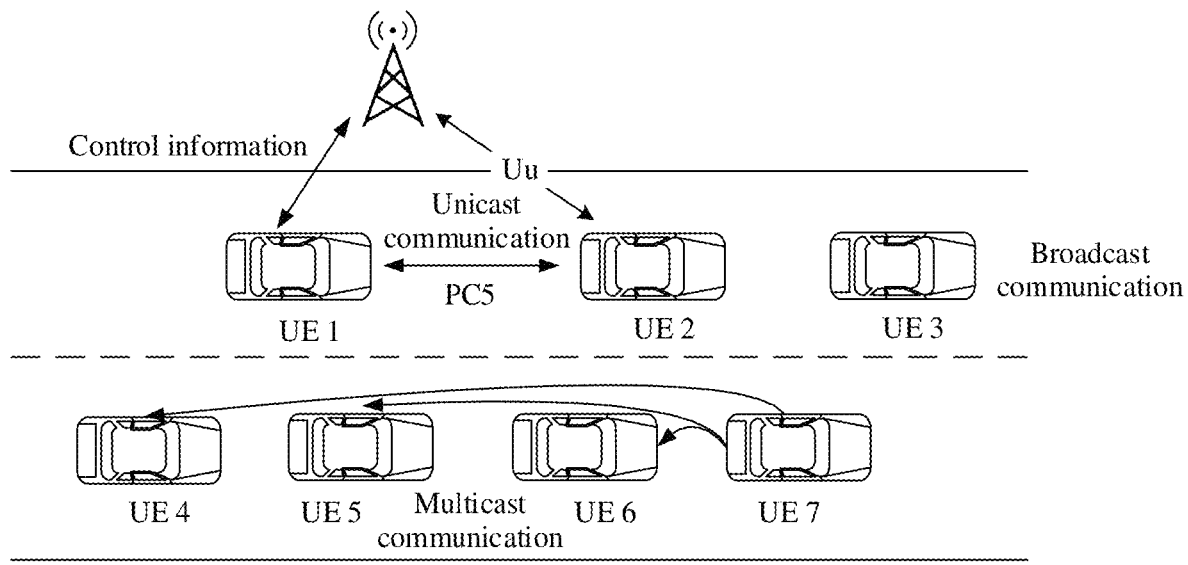
FIG. 4 is a schematic diagram of an architecture of a V2X network system.

A new radio access technology is a future mainstream wireless communication technology. For a V2X service feature and a new service requirement, the new radio access technology can support V2X communication having a lower delay and higher reliability. FIG. 4 is a diagram of an architecture of a V2X network system. In the V2X system shown in FIG. 4, there are mainly two types of air interfaces: a communication interface (a Uu interface) between a terminal UE 1 and a base station and a communication interface (a PC5 interface) between the terminal UE 1 and a terminal UE 2. The Uu interface is used for communication between a terminal/road side unit and the base station, and the PC5 interface is used for sidelink communication between terminals/road side units.

For example, in a communication scenario, the terminals may communicate with each other based on a sidelink resource in a manner including but not limited to a unicast, multicast, or broadcast manner. For example, as shown in FIG. 4, UE 3 may perform communication in the broadcast manner. The UE 1 may communicate with the UE 2 in the unicast manner. UE 4, UE 5, UE 6, and UE 7 may be a group of terminals, and one or more terminals in the group of terminals may communicate with any one or more other terminals in the group of terminals. For example, the UE 7 may communicate with another terminal in the group of terminals, namely, the UE 4, the UE 5, and the UE 6 in the multicast manner. The one or more terminals in the group of terminals may further communicate with any one or more other terminals outside the group of terminals, where the any one or more other terminals are not limited to belonging to the group of terminals.

There may be two slot formats in an NR system. One is a normal slot format, and the other is a self-contained slot format.

Figure 5:
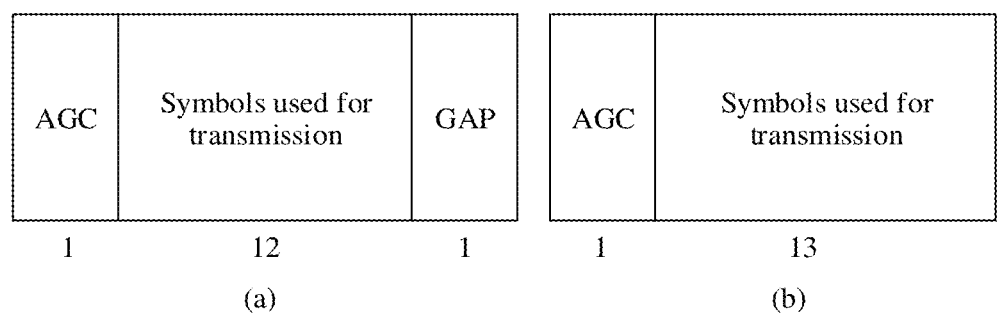
FIG. 5 is a schematic diagram of an exemplary normal slot format according to an embodiment.

The following describes in detail the normal slot format with reference to FIG. 5.

For example, one slot may include 14 symbols, or may include 12 symbols. This is not limited herein.

It should be understood that, in a general standard or in the field of communication technologies, a format of a slot for transmitting information is described from a perspective of a transmitter terminal device. For ease of description, the following uses sending information by the transmitter terminal device and receiving information by the transmitter terminal device as an example, to describe in detail a specific function of each symbol in a slot in each slot format. It may be understood that, for a receiver terminal device, symbols used for sending and receiving in a slot in a same slot format interactively correspond to those of the transmitter terminal device.

In the normal slot format, all of symbols that can be used for transmission in one slot are used to send information, or all of symbols that can be used for transmission in one slot are used to receive information. The information includes data and/or feedback information. In the slot in the normal slot format, transmission directions in which a terminal device transmits data and/or transmits feedback information are consistent, and the transmission direction refers to a sending direction or a receiving direction.

The normal slot format may have two forms. In a first exemplary form, one symbol in one slot is used for automatic gain control (AGC), the last symbol is used for a guard interval (e.g. gap), and remaining symbols are symbols that can be used for transmission in one slot. All of the symbols that can be used for transmission are used to send information or receive information. For example, the transmitter terminal device sends data and/or sends feedback information on a symbol used to send information. In a second exemplary form, one symbol in one slot is used for AGC, and remaining symbols are symbols that can be used for transmission in one slot. In the normal slot format, the transmission directions in which the terminal device transmits data and/or transmits feedback information are consistent.

For example, in one slot, the transmitter terminal device sends data to the receiver device on the symbols that can be used for transmission. Alternatively, the transmitter terminal device sends feedback information to the receiver terminal device on the symbols that can be used for transmission. Alternatively, the transmitter terminal device sends data to the receiver terminal device on some of the symbols that can be used for transmission, and sends feedback information to the receiver terminal device on the remaining symbols that can be used for transmission.

In other words, in one slot, there is no case in which the terminal device simultaneously receives information (that is, receives data and/or receives feedback information) and sends information (that is, sends data and/or sends feedback information).

The following describes in detail the normal slot format with reference to FIG. 5.

For example, the figure (a) on the left in FIG. 5 is an exemplary representation form of the normal slot format, namely, the form 1. In a slot including 14 symbols, content transmitted on the 14 symbols is: AGC may occupy one symbol, a gap may occupy one symbol, and remaining 12 symbols may be used to transmit information. The figure (b) on the right in FIG. 5 is another exemplary representation form of the normal slot format, namely, the second exemplary form. In a slot including 14 symbols, content transmitted on the 14 symbols is: AGC may occupy one symbol, and remaining 13 symbols may be used to transmit information. The last gap symbol in the first exemplary form may be used for transmit/receive transition of the terminal device, or may be used for transition between sidelink transmission between terminal devices and uplink transmission between the terminal device and a base station. In a slot including 14 symbols, except the AGC symbol and/or the gap symbol, the terminal device uses 12 symbols or 13 symbols (namely, the symbols that can be used to transmit information in the slot) to transmit information. For one terminal device, transmission directions on all the symbols are consistent.

For example, the transmitter terminal device may send data to the receiver terminal device on 12 or 13 symbols in the slot.

For another example, the transmitter terminal device may send feedback information to the receiver terminal device on 12 or 13 symbols in the slot. Optionally, the feedback information may be feedback information that indicates whether the receiver terminal device successfully receives data after the transmitter terminal device sends the data to the receiver terminal device on 12 or 13 symbols in the first P slots, where P≥1, and P is a positive integer.

For another example, the transmitter terminal device may send data to the receiver terminal device on L symbols of 12 or 13 symbols in the slot, and sends feedback information to the receiver terminal device on (12-L) or (13-L) symbols in the slot. For example, the feedback information may be feedback information that indicates whether the receiver terminal device successfully receives data after the transmitter terminal device sends data to the receiver terminal device on L symbols of 12 or 13 symbols in the slot. For another example, the feedback information may be feedback information that indicates whether the receiver terminal device successfully receives data after the transmitter terminal device sends the data to the receiver terminal device on L symbols of 12 or 13 symbols in the first P slots. When the terminal device transmits data by using 12 symbols, 1≤L≤11, and L is a positive integer. When the terminal device transmits data by using 13 symbols, 1≤L≤12.

The first symbol in one slot may be the AGC. The AGC is used for an automatic gain control function of the receiver terminal device. The first symbol in the slot may further be used for sending and receiving data. It should be noted that the automatic gain control of the AGC symbol is for the receiver terminal device. The transmitter terminal device sends data on the AGC symbol. The receiver terminal device determines, based on a dynamic gain range, an operation to be performed on the AGC symbol. If the dynamic gain range of the receiver terminal device is relatively large, the data on the AGC symbol may further be used for decoding, to improve a decoding success rate. Conversely, if the dynamic gain range of the receiver terminal device is relatively small, the AGC symbol is used to adjust a gain. The data or feedback information is received from the first symbol after the AGC symbol. Optionally, in different subcarrier spacing systems, lengths of symbols are different, quantities of symbols occupied by the AGC and the gap need to be determined based on parameters such as a capability or a transmit/receive transient period and/or a coverage range of the receiver terminal device, and are less than or greater than one symbol may be used. This is not limited herein.

Optionally, a feedback channel is used to carry feedback information, and the feedback information may be a channel state information report. Channel status information may include at least one piece of the following information: a channel quality indicator, a precoding matrix indication, a rank indication, a reference signal received power, reference signal received quality, a sounding reference signal resource indication, a channel state information-reference signal resource indication, information that identifies channel states such as a doppler spread and a delay spread. The channel status information may be time-frequency resource information available for the receiver terminal device, or may be interference information measured by the receiver terminal device, or the like.

When the transmitter terminal device sends feedback information to the receiver terminal device on the symbols used for transmission in one slot, a channel occupied by the feedback information may be a physical layer sidelink feedback channel (physical sidelink feedback channel, PSFCH) disposed on a sidelink. In the NR system, a time domain resource occupied by an uplink control channel, such as a physical uplink control channel (PUCCH) may be designed based on a quantity of bits occupied by data information, a feedback reliability requirement, and the like. A time domain resource occupied by the PSFCH may also be determined based on a quantity of bits occupied by the feedback information and the feedback reliability requirement.

Optionally, based on a quantity of symbols occupied by the feedback information in the normal slot, the feedback channel may occupy 2 to 13 orthogonal frequency division multiplexing (OFDM) symbols in one slot. If the sidelink uses a discrete Fourier transform-orthogonal frequency division multiplexing (DFT-OFDM) waveform, a DFT-OFDM symbol may be used. The following uses the OFDM symbol as an example for description, but a waveform symbol is not limited herein.

Figure 6:
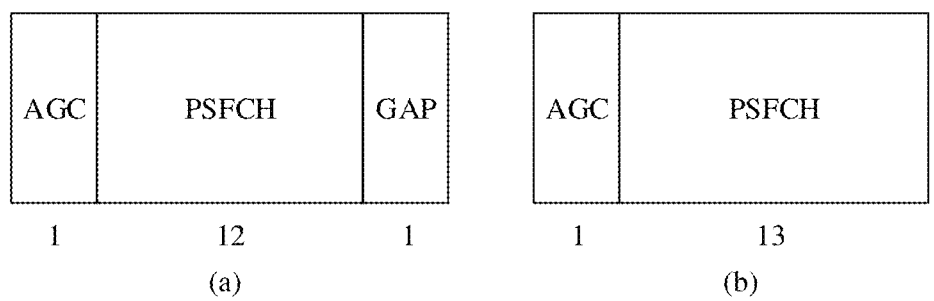
FIG. 6 is a schematic diagram of a PSFCH time domain resource according to an embodiment.

For example, in the normal slot format, a corresponding PSFCH time domain resource may be shown in FIG. 6. The PSFCH time domain resource in FIG. 6 corresponds to the normal slot format in FIG. 5, that is, the time domain resource occupied by the PSFCH in FIG. 6 is determined based on the symbols occupied by the feedback information in the normal slot format in FIG. 5.

As shown in the figure (a) on the left in FIG. 6, the PSFCH time domain resource may occupy 12 available OFDM symbols in one slot, and the time domain resource occupied by the PSFCH is the second symbol to the thirteenth symbol in one slot. As shown in the figure (b) on the right in FIG. 6, the PSFCH time domain resource may occupy 13 available OFDM symbols in one slot, and the time domain resource occupied by the PSFCH is the second symbol to the fourteenth symbol in one slot.

In the self-contained slot format, in one slot, P symbols in the symbols that can be used for transmission are used to send information and N symbols are used to receive information, where the information includes data and/or feedback information, 8≤P≤11, 1≤N≤2, P and N are positive integers, and specific values of P and N are related to a quantity of symbols that can be used for transmission in the slot. For example, in the slot in the self-contained slot format, transmission directions of the terminal device on different parts of symbols are inconsistent.

The self-contained slot format may also have two forms. In form A, one symbol in one slot is used for AGC, one symbol between a symbol used to send information and a symbol used to receive information is used for a guard interval (gap), another symbol in one slot is further used for a guard interval, that is, one slot includes two gaps, and remaining symbols are symbols that can be used for transmission in one slot. For example, the transmitter terminal device sends data on the symbol used to send information, and the transmitter terminal device receives feedback information on the symbol used to receive information. In form B, one symbol in one slot is used for AGC, one symbol between a symbol used to send information and a symbol used to receive information is used for a gap, and remaining symbols are symbols that can be used for transmission in one slot. For example, the transmitter terminal device sends data on the symbol used to send information, and the transmitter terminal device receives feedback information on the symbol used to receive information. In the self-contained slot format, a transmission direction in which the terminal device transmits data is inconsistent with a transmission direction in which the terminal device transmits feedback information. It should be understood that the foregoing two forms are merely examples, and the slot corresponding to the self-contained slot format may also have another layout form. This is not limited in the exemplary embodiments.

For example, the transmitter terminal device sends data to the receiver terminal device on the symbol used to send information in the slot, and the transmitter terminal device receives, on the symbol used to receive information in the slot, feedback information sent by the receiver terminal device. Optionally, the feedback information may be feedback information that indicates whether the receiver terminal device successfully receives data after the transmitter terminal device sends the data to the receiver terminal device on the symbol used to send information in the slot. Optionally, the feedback information may alternatively be information indicating that the receiver terminal device sends, to the transmitter terminal device, a channel state, time-frequency resource information available for the receiver terminal device, interference information measured by the receiver terminal device, or the like.

For another example, the transmitter terminal device sends data to the receiver terminal device on the symbol used to send information in the slot, and receives, on the symbol used to receive information in the slot, feedback information sent by the receiver terminal device. Optionally, the feedback information may be feedback information that indicates whether the receiver terminal device successfully receives data after the transmitter terminal device sends the data to the receiver terminal device on the symbol used to send information in the slot.

Optionally, in one slot, the gap symbol usually further needs to be used between a symbol used to send data and a symbol used to receive feedback information, or between a symbol used to receive data and a symbol used to send data, to eliminate impact of the transmit/receive transient period.

Figure 7:
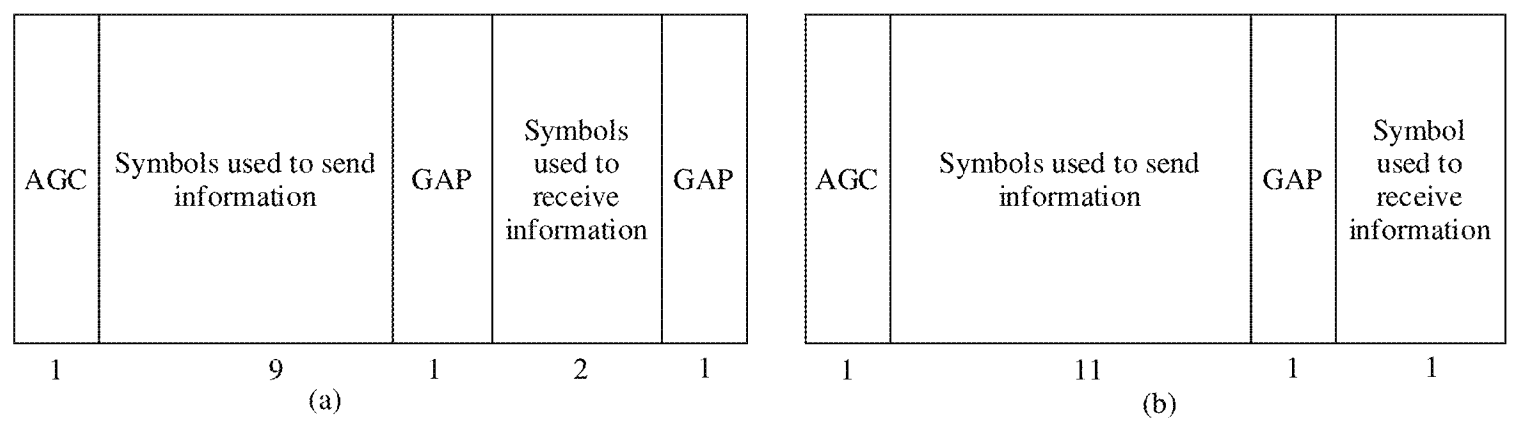

The following describes in detail the self-contained slot format with reference to FIG. 7.

For example, the figure (a) on the left in FIG. 7 is an exemplary representation form of the self-contained slot format, namely, the form A. In a slot including 14 symbols, content transmitted on the 14 symbols is: AGC may occupy one symbol, nine symbols are used to send data, the gap between a symbol used to send data and a symbol used to receive feedback information may occupy one symbol, two symbols are used to receive feedback information, and a gap at the end of the slot may further occupy one symbol. The figure (b) on the right in FIG. 7 is another exemplary representation form of the self-contained slot format, namely, the form B. In a slot including 14 symbols, content transmitted on the 14 symbols is: AGC may occupy one symbol, 11 symbols are used to send data, the gap may occupy one symbol, and one symbol is used to receive feedback information.

For example, the transmitter terminal device sends data to the receiver terminal device on nine symbols used to send information in the slot, and the transmitter terminal device receives, on two symbols used to receive information in the slot, feedback information sent by the receiver terminal device. Optionally, the feedback information may be feedback information that indicates whether the receiver terminal device successfully receives data after the transmitter terminal device sends the data to the receiver terminal device on the nine symbols used to send information in the slot. Optionally, the feedback information may alternatively be information indicating that the receiver terminal device sends, to the transmitter terminal device, a channel state, time-frequency resource information available for the receiver terminal device, interference information measured by the receiver terminal device, or the like.

For another example, the transmitter terminal device sends data to the receiver terminal device on 11 symbols used to send information in the slot, and receives, on one symbol used to receive information in the slot, feedback information sent by the receiver terminal device. Optionally, the feedback information may be feedback information that indicates whether the receiver terminal device successfully receives data after the transmitter terminal device sends the data to the receiver terminal device on the 11 symbols used to send information in the slot.

Optionally, before the symbol for transmitting feedback information, there may be another symbol used for an AGC function. In this case, in the slot including 14 symbols, content transmitted on the 14 symbols is: The AGC may occupy one symbol, the symbols used to send information may occupy eight symbols, the gap may occupy one symbol, one symbol between the gap and the symbols used to receive information may be used for the AGC, the symbols used to receive information occupy two symbols, and the gap may further use one symbol: or the AGC may occupy one symbol, the symbols used to send information may occupy 10 symbols, the gap may occupy one symbol, one symbol between the gap and the symbol used to receive information may be used for the AGC, and the symbol used to receive information occupies one symbol.

Optionally, the terminal device may transmit data and/or feedback information by using the normal slot format, or may transmit data and/or feedback information by using the self-contained slot format. When the terminal device has an extremely low delay requirement, the self-contained slot format is preferentially used to transmit data and/or transmit feedback information.

Optionally, based on a quantity of symbols occupied by feedback information in the self-contained slot format, a feedback channel in one slot may occupy one to two OFDM symbols. In this case, the feedback channel may be placed on the last symbol or the last but two symbol to the last but one symbol in one slot in the self-contained slot format, to feed back data sending on the symbol used to send information in the self-contained slot format.

Figure 8:
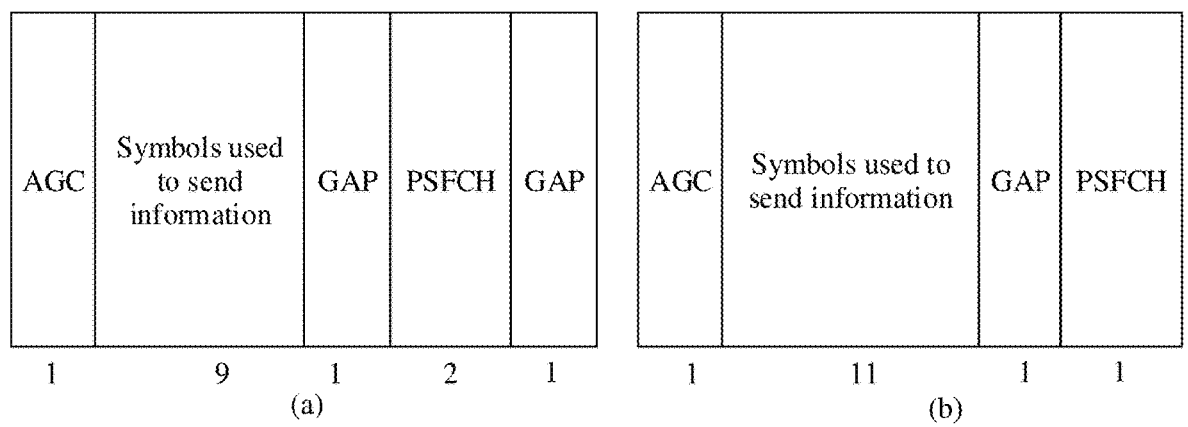
FIG. 8 is another schematic diagram of a PSFCH time domain resource according to an embodiment.

For example, in the self-contained slot format, a corresponding PSFCH time domain resource may be shown in FIG. 8. The PSFCH time domain resource in FIG. 8 corresponds to the self-contained slot format in FIG. 7, that is, the time domain resource occupied by the PSFCH in FIG. 8 is determined based on the symbols occupied by feedback information in the self-contained slot format in FIG. 7.

As shown in the figure (a) on the left in FIG. 8, the PSFCH time domain resource may occupy two available OFDM symbols in one slot, and the time domain resource occupied by the PSFCH is the last but one symbol and the last but two symbol in one slot. As shown in the figure (b) on the right in FIG. 8, the PSFCH time domain resource may occupy one available OFDM symbol in one slot, and the time domain resource occupied by the PSFCH is the last symbol in one slot.

Figure 9:
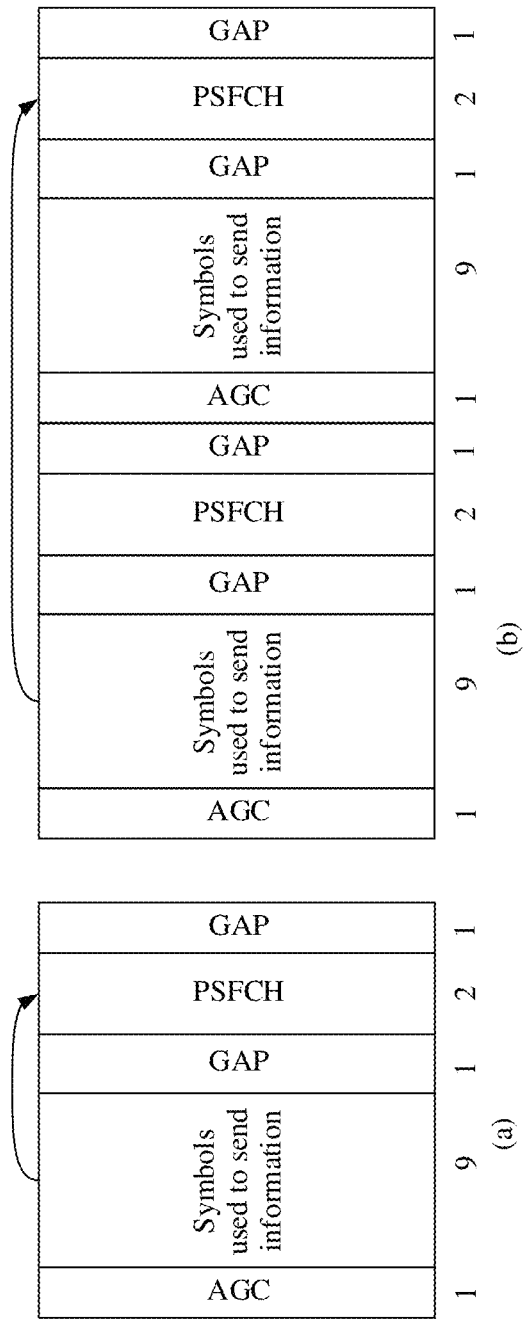
FIG. 9 is still another schematic diagram of a PSFCH time domain resource according to an embodiment.

Optionally, as shown in the figure (a) on the left in FIG. 9, the feedback information received on the symbol used to receive information in the self-contained slot may be feedback information that indicates whether the receiver terminal device successfully receives data after the transmitter device sends the data to the receiver terminal device on the symbol used to send information in the slot. Alternatively, as shown in the figure (b) on the right in FIG. 9, the feedback information in the self-contained slot may be feedback information that indicates whether the receiver terminal device successfully receives data after the transmitter device sends the data to the receiver terminal device on the symbol used to send information in the foregoing slot. Optionally, in an extended cyclic prefix slot, one slot includes 12 OFDM symbols. In this case, time domain resources occupied by the AGC and the gap remain unchanged. Correspondingly, the time domain resource used by the PSFCH is reduced by two OFDM symbols.

Optionally, a time interval between a time point at which feedback information is transmitted and a time point at which data is transmitted may be predefined.

For example, a sidelink shared channel-to-hybrid automatic repeat request (HARQ) feedback timing (PSSCH_to_HARQ-feedback-timing) field carried in a system message sent by the network device indicates a time interval between a time point at which a HARQ is fed back and a time point at which corresponding data is transmitted.

For example, the time interval is a, and a may be a positive integer. For example, a may be a fixed value 4, that is, feedback information is transmitted in the fourth slot after data transmission.

Optionally, the time interval between the time point at which feedback information is transmitted and the time point at which data is transmitted may be indicated by the transmitter terminal device in SCI.

For example, if the transmitter terminal device sends data in an $n^{th}$ slot, the SCI sent in the $n^{th}$ slot includes: A feedback slot for transmitting feedback information for the data sent in the $n^{th}$ slot is k, that is, feedback information is transmitted in a $k^{th}$ slot after the current data is sent, where n and k are positive integers.

Optionally, a time for transmitting feedback information in the PSFCH may also be defined as a feedback time window, for example, 1 and m. For example, feedback information is transmitted in any slot from an 1th slot to an mth slot (including the 1th slot and the mth slot) after the current data is sent, where 1 and m are positive integers.

Optionally, the SCI may further include feedback information symbol indication information, where the feedback information symbol indication information is used to indicate a symbol for sending feedback information. The feedback information symbol indication information may be indicated by system slot format configuration information carried in the system message sent by the network device.

Optionally, the format of the slot for feedback information may be determined by the transmitter terminal device. For example, if the transmitter terminal device indicates a value of PSSCH_to_HARQ-feedback-timing in SCI, for example, k=0, the transmitter terminal device feeds back feedback information on the last symbol in the slot based on the self-contained slot format configured by the network device.

For example, the network device may configure one self-contained slot format at an interval of one slot, that is, configure one self-contained slot format every two slots.

For example, the normal slot format that may be configured by the network device may be shown in FIG. 5(a), and the self-contained slot is shown in FIG. 7(a).

Figure 10:
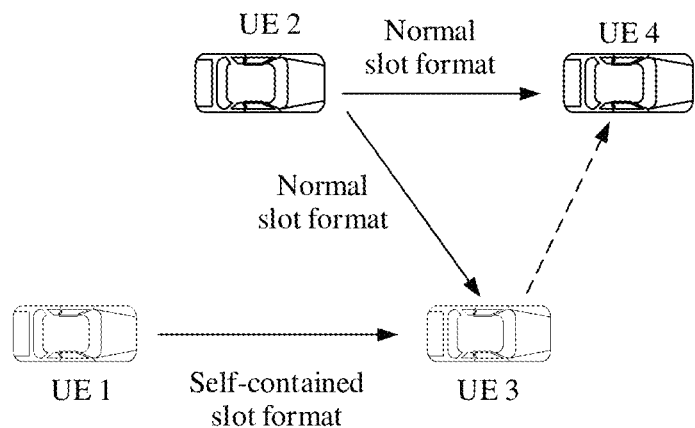
FIG. 10 is a schematic diagram of communication between terminal devices according to an embodiment.

When terminal devices communicate with each other, the normal slot format may be used, or the self-contained slot format may be used. For example, as shown in FIG. 10, UE 3 receives data and/or feedback information sent by UE 1 and UE 2, and UE 4 also receives data and/or feedback information sent by the UE 2. The UE 1 sends the data by using the self-contained slot format, and the UE 2 sends the data by using the normal slot format. Transmission directions of transmitting data and feedback information in the self-contained slot format are inconsistent, that is, on one or two symbols in a slot, the UE 3 needs to send feedback information to the UE 1, and in this case, the UE 3 further needs to receive the data sent by the UE 2. Therefore, the UE 3 is in a sending state and is also in a receiving state. However, a terminal device on a sidelink uses a half-duplex mode, that is, one terminal device cannot simultaneously send and receive data. Therefore, data cannot be successfully transmitted when the terminal devices communicate with each other. In addition, when the UE 3 sends feedback information to the UE 1, a signal of the UE 3 also affects receiving of the UE 4. The first symbol that is used for an AGC function and that is measured by the UE 4 does not contain a transmitting signal sent by the UE 3: however, on the thirteenth symbol, because the UE 3 sends feedback information to the UE 1, new interference is generated on the UE 4, and the data that is received by the UE 4 and that is sent by the UE 2 on the symbol is affected, thereby affecting receiving of data by the terminal device in an entire slot.

A method is provided in the exemplary embodiments. Before a first terminal device transmits data and/or feedback information, the first terminal device determines, based on a slot format corresponding to at least one other terminal device in a first slot, a slot format corresponding to transmitting data and/or feedback information in the first slot.

Figure 11:
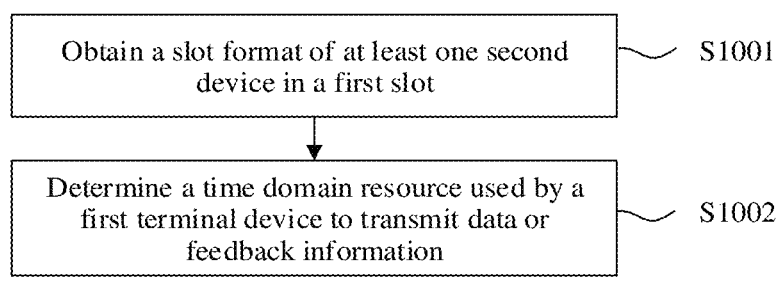
FIG. 11 is a schematic flowchart of a transmission resource determining method according to an embodiment.

The following describes in detail the method provided in the embodiments with reference to FIG. 11.

FIG. 11 is a schematic flowchart of a transmission resource determining method according to an embodiment. The method in FIG. 11 may be performed by a first terminal device.

In step S1001, the first terminal device obtains a slot format corresponding to at least one other terminal device in a first slot.

It may be understood that the slot format corresponding to the at least one other terminal device in the first slot may be understood as that one slot format corresponds to one terminal device.

It may be understood that, that the first terminal device obtains a slot format corresponding to at least one other terminal device in a first slot may be understood as that the first terminal device obtains slot formats corresponding to a plurality of terminal devices.

Optionally, when the first terminal device needs to communicate with another terminal device, the first terminal device may obtain the slot format corresponding to the at least one other terminal device in the first slot.

Optionally, a second terminal device is any one of the at least one other terminal device.

For example, the first terminal device and the second terminal device fall within a specific effective range. In an exemplary embodiment, a distance between the first terminal device and the second terminal device does not exceed a first threshold, where the first threshold is a predefined distance value. The first terminal device may obtain a slot format corresponding to the second terminal device in the first slot.

Optionally, the first terminal device detects, in the first slot, SCI sent by each of the at least one other terminal device, where the SCI is used to indicate the slot format corresponding to the at least one other terminal device in the first slot.

Optionally, the first terminal device obtains configuration information sent by a base station, where the configuration information is used to indicate the slot format corresponding to the at least one other terminal device in the first slot.

Optionally, the slot format corresponding to the at least one other terminal device in the first slot may include at least one of the following slot formats.

A first slot format (for example, which may be a normal slot format) is included. The first slot format corresponding to the second terminal device in the first slot is that all of symbols that can be used for transmission in the first slot are used by the second terminal device to send information, where the information includes data and/or feedback information, that is, the second terminal device sends data and/or sends feedback information on M symbols in the first slot, where 1<M<14, and M is a positive integer.

For example, the first slot format may be the normal slot format shown in FIG. 5. In the figure (a) on the left in FIG. 5, the second terminal device may send data and/or feedback information on 12 symbols used for transmission in the first slot. In the figure (b) on the right in FIG. 5, the second terminal device may send data and/or feedback information on 13 symbols used for transmission in the first slot.

A second slot format (for example, which may be a self-contained slot format) is further included. The second slot format corresponding to the second terminal device in the first slot is that P symbols in the symbols that can be used for transmission in the first slot are used by the second terminal device to send information, and N symbols are used by the second terminal device to receive information, where 8≤P≤11, 1≤N≤2, P and N are positive integers, and specific values of P and N are related to a quantity of symbols that can be used for transmission in one slot. In other words, in a slot in the self-contained slot format, transmission directions of the terminal device on symbols of different parts are inconsistent.

For example, the second terminal device may send data on the P symbols used to send information in the first slot, and receive feedback information on the N symbols used to receive information.

For example, the second slot format may be the self-contained slot format shown in FIG. 7. In the figure (a) on the left in FIG. 7, the second terminal device may send data on nine symbols used to send information in the first slot, and the second terminal device may further receive feedback information on two symbols used to receive information in the first slot. In the figure (b) on the right in FIG. 7, the second terminal device may send data on 11 symbols used to send information in the first slot, and the second terminal device may further receive feedback information on one symbol used to receive information in a third slot. For example, the feedback information may be feedback information that indicates whether the terminal device communicating with the second terminal device successfully receives the data after the second terminal device sends the data on the 11 symbols in the first slot. The third slot is a slot after the first slot, that is, the second terminal device receives the feedback information in a $k^{th}$ slot after the data is sent.

Optionally, a slot format that is of at least one second terminal device in the first slot and that is obtained by the first terminal device may be indicated by the at least one second terminal device.

For example, the slot format that is of the at least one second terminal device in the first slot and that is obtained by the first terminal device may directly indicate whether the at least one second terminal device uses the second slot format.

Optionally, the slot format that is of the at least one second terminal device in the first slot and that is obtained by the first terminal device may alternatively be sent by the base station.

For example, the base station may configure, for each terminal device, slot format information for transmitting data and/or transmitting feedback information by each terminal device. For example, the base station may configure, by using a bitmap, a slot format used for sidelink communication as the self-contained slot format, and configure another slot as the normal slot. For example, the base station may use 1 to identify the self-contained slot format, use 0 to identify the normal slot format, and may use 8 bits to indicate slot formats. For example, 10110000 may be understood as slot formats used for communication of eight sidelinks, where the first slot, the third slot, and the fourth slot are self-contained slot formats, and the second slot, the fifth slot, the sixth slot, the seventh slot, and the eighth slot are normal slot formats. This is not limited herein.

For example, the base station may further configure a format of each symbol in the self-contained slot. For example, the base station may use S to identify a symbol used for sidelink transmission in the slot, and use X to identify a gap. For example, for a slot including 14 symbols, SSSSSSSSSSSXSX is used to identify that the first 11 symbols are sidelink transmission symbols, the twelfth symbol is a gap symbol, the thirteenth symbol is a sidelink transmission symbol, and the fourteenth symbol is the gap symbol. On a transmitter UE side, an AGC symbol is not distinguished from a sending symbol. Therefore, the first symbol is identified by S.

Optionally, the first terminal device may further detect, in a slot before the first slot, SCI sent by each of at least other second terminal device, where the SCI is used to indicate a slot format corresponding to the at least one other terminal device in the second slot. Optionally, the first terminal device decodes the SCI sent by each of the at least one other terminal device in the second slot, and determines the slot format corresponding to the at least one other terminal device in the second slot based on a physical sidelink shared channel-to-hybrid automatic repeat request feedback timing (PSSCH_to_HARQ_feedback-timing) field carried in the SCI sent by the at least one other terminal device.

Optionally, the SCI may alternatively include resource reservation information, where the resource reservation information may be used to indicate the slot format used by the at least one other terminal device to transmit data in the first slot.

Optionally, the resource reservation information may alternatively be used to indicate a periodicity in which each of the at least one other device sends data and/or feedback information by using the slot format used for transmitting data in the first slot once. For example, the second terminal device may continue to use the slot format for transmitting data in the first slot at an interval of a predetermined periodicity.

Optionally, the SCI may further include information about a repeated transmission time interval. The first terminal device may determine, based on information about the repeated transmission time interval, a time interval at which the at least one other terminal device continuously repeatedly transmits data in the first slot by using the slot format the same as that in the second slot.

Optionally, the second slot is earlier than the first slot. For example, the first terminal device may obtain, in advance, the slot format used by the at least one other terminal device in the first slot, or may obtain, in advance, the interval or the periodicity of the slot format used by the at least one other terminal device in the first slot. Therefore, a time domain resource for transmitting data and/or feedback information by each terminal device can be properly arranged, thereby improving transmission efficiency of transmitting data and/or feedback information.

In step S1002, the first terminal device determines, based on the slot format corresponding to the at least one other terminal device in the first slot, a slot format corresponding to the first terminal device in the first slot.

Optionally, before determining, based on the slot format corresponding to the at least one other terminal device in the first slot, the slot format corresponding to the first terminal device in the first slot, the first terminal device needs to first determine whether the first terminal device has information that needs to be sent.

Figure 12:
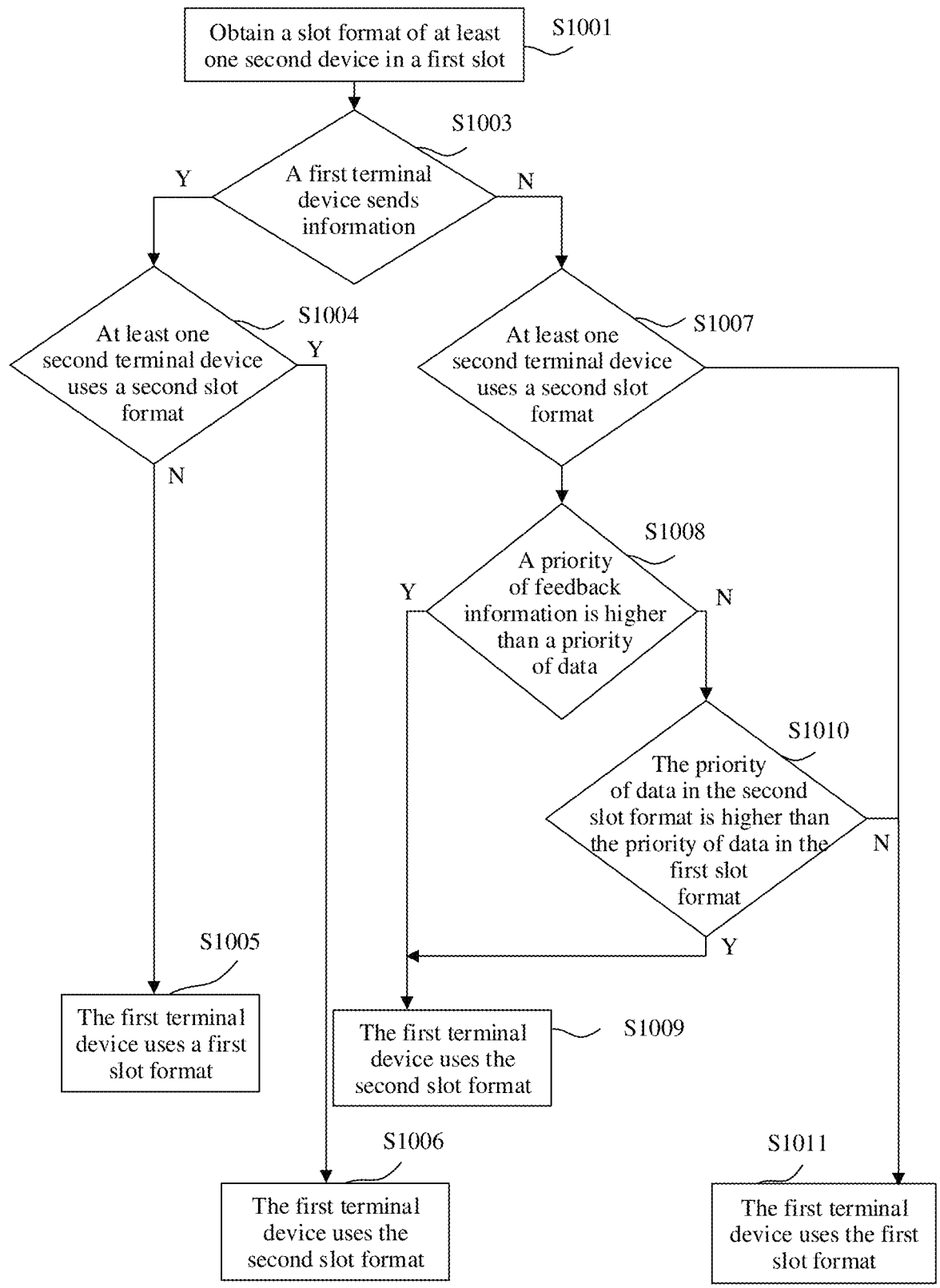
FIG. 12 is a schematic flowchart of a transmission resource determining method according to another embodiment.

With reference to FIG. 12, step S1002 in this embodiment is described in detail below.

FIG. 12 is a schematic flowchart of a transmission resource determining method according to an embodiment. The method in FIG. 12 may be performed by the first terminal device.

For step S1001, refer to the foregoing descriptions. Detailed descriptions are omitted herein.

In step S1003, an exemplary embodiment may determine whether the first terminal device has information that needs to be sent.

If the first terminal device has information that needs to be sent, step S1004 is performed.

In step S1004, an exemplary embodiment may determine whether the slot format that is obtained by the first terminal device and that corresponds to the at least one other terminal device in the first slot includes the second slot format.

If the slot format that is obtained by the first terminal device and that corresponds to the at least one other terminal device in the first slot does not include the second slot format, that is, if the slot format that is obtained by the first terminal device and that corresponds to the at least one second terminal device in the first slot includes only the first slot format, step S1005 is performed.

In step S1005, the first terminal device does not use the second slot format to send information, that is, the first terminal device determines that the slot format corresponding to the first terminal device in the first slot is the first slot format, and the first terminal device sends information by using the first slot format. For example, all of symbols that can be used for transmission in the first slot format are used by the first terminal device to send information.

If the slot format that is obtained by the first terminal device and that corresponds to the at least one other terminal device in the first slot includes the second slot format, step S1006 is performed.

In step S1006, the first terminal device determines that the slot format corresponding to the first terminal device in the first slot is the second slot format.

Optionally, P symbols in symbols that can be used for transmission in the second slot format are used by the first terminal device to send information, and N symbols are used by the first terminal device to receive information.

Optionally, the feedback information received on the N symbols used by the first terminal device to receive information may be feedback information that indicates whether the terminal device communicating with the first terminal device successfully receives data after the first terminal device sends the data on P symbols used to send information in the first slot.

Optionally, the feedback information received on the N symbols used by the first terminal device to receive information may be feedback information that indicates whether the terminal device communicating with the first terminal device successfully receives data after the first terminal device sends the data on P symbols used to send information in a slot earlier than the first slot.

Figure 13:
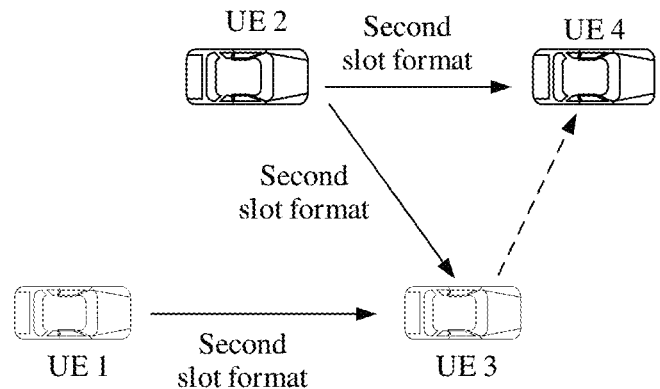
FIG. 13 is another schematic diagram of communication between terminal devices according to an embodiment.

For example, as shown in FIG. 13, UE 3 receives data and/or feedback information sent by UE 1 and UE 2, and UE 4 also receives data and/or feedback information sent by the UE 2. The UE 2 may be the first terminal device, and the UE 1 may be the second terminal device. The UE 2 obtains a second slot format used by the UE 1 in a first slot to send data and receive feedback information. In this case, the UE 2 determines that 10 symbols of the UE 2 in the first slot are used to send data and/or send feedback information, and determines that one or two symbols in the first slot are used to receive feedback information sent by the UE 3 or the UE 4. A slot in which the UE 2 sends data to the UE 4 is earlier than the first slot. Alternatively, the UE 2 may determine that one or two symbols in the first slot are used to send feedback information to the UE 4, where the feedback information corresponds to the data sent by the UE 4 and received by the UE 2, and a slot in which the UE 4 sends data is earlier than the first slot. The first terminal device may receive feedback information on a symbol corresponding to the first slot, or the first terminal device may send feedback information on a symbol corresponding to the first slot, so that impact on receiving data by a receiver terminal device on the corresponding symbol in the first slot can be avoided, and a transmission success rate of transmitting data and feedback information between terminal devices can be improved.

When the first terminal device sends information, and the at least one other terminal device sends data and/or sends feedback information on 2 to 14 symbols in the first slot, correspondingly, the first terminal device also sends data and/or sends feedback information on the symbol corresponding to the first slot, so that the transmission success rate of transmitting data and/or feedback information between the terminal devices can be improved.

If the first terminal device does not need to send information, that is, the first terminal device is in an information receiving state, step S1007 is performed.

In step S1007, an exemplary embodiment may determine whether the slot format that is obtained by the first terminal device and that corresponds to the at least one other terminal device in the first slot includes the second slot format.

If the slot format that is obtained by the first terminal device and that corresponds to the at least one other terminal device in the first slot does not include the second slot format, that is, if the slot format that is obtained by the first terminal device and that corresponds to the at least one other terminal device in the first slot includes only the first slot format, step S1011 is performed.

In step S1011, the first terminal device does not use the second slot format to receive information, that is, the first terminal device determines that the slot format corresponding to the first terminal device in the first slot is the first slot format, and the first terminal device receives information by using the first slot format. For example, all of the symbols that can be used for transmission in the first slot format are used by the first terminal device to receive information.

Optionally, the data received by the first terminal device on the symbols that can be used for transmission may be data sent by the terminal device communicating with the first terminal device on the symbols that can be used for transmission in the first slot.

Optionally, the feedback information received by the first terminal device on the symbols that can be used for transmission may be feedback information that indicates whether the terminal device communicating with the first terminal device successfully receives data after the first terminal device sends the data on symbols that can be used for transmission in the second slot. The second slot may be earlier than the first slot.

If the slot format that is obtained by the first terminal device and that corresponds to the at least one other terminal device in the first slot includes the second slot format, step S1008 is performed.

In step S1008, the first terminal device determines whether a priority of sending feedback information is higher than a priority of receiving data.

If the priority of sending feedback information is higher than the priority of receiving data, step S1009 is performed.

In step S1009, when the priority of feedback information is higher than the priority of data, the first terminal device determines that the slot format corresponding to the first terminal device in the first slot is the second slot format.

Optionally, P symbols in symbols that can be used for transmission in the second slot format are used by the second terminal device to receive data, and N symbols are used by the second terminal device to send feedback information. In other words, the first terminal device may determine that the P symbols in the first slot are time domain resources for receiving data and/or receiving feedback information, and the N symbols in the first slot are time domain resources for sending feedback information or receiving feedback information. The feedback information may be feedback information sent by the first terminal device after the first terminal device receives data sent by the terminal device communicating with the first terminal device. The data sent by the first terminal device may be data sent in the first slot, or may be data sent in another slot earlier than the first slot. The received feedback information may be feedback information that is received by the first terminal device and sent by the second terminal device and indicates whether data is successfully received after the first terminal sends the data. The data sent by the first terminal may be data sent in another slot earlier than the first slot.

When the first terminal device is the receiver terminal device, the first terminal device determines that the priority of sending feedback information in the first slot is higher than the priority of receiving data in the first slot, and the first terminal device preferentially sends feedback information on one or two symbols in the first slot. Therefore, the transmission success rate of transmitting data and feedback information between the terminal devices can be improved.

If the priority of sending feedback information is lower than the priority of transmitting data, step S1010 is performed.

In step S1010, the first terminal device determines whether a priority of data and/or feedback information received by using the first slot format in the first slot is lower than a priority of data and/or feedback information received by using the second slot format in the first slot.

If the priority of data and/or feedback information received by using the first slot format is lower than the priority of data and/or feedback information received by using the second slot format, step S1009 is performed.

If the priority of data and/or feedback information received by using the first slot format is higher than the priority of data and/or feedback information received by using the second slot format, step S1011 is performed.

In step S1011, the first terminal device determines that the slot format corresponding to the first terminal device in the first slot is the first slot format.

Optionally, all of symbols that can be used for transmission in the first slot format are used by the first terminal device to receive information.

Optionally, P symbols in symbols that can be used for transmission in the first slot format are used by the first terminal device to receive data, and the N symbols are used by the second terminal device to receive feedback information.

When the first terminal device is the receiver terminal device, the first terminal device determines a specific slot format that is of the at least one other terminal device and that has a higher priority, and the first terminal device correspondingly uses the slot format having the higher priority to transmit data and/or transmit feedback information. Therefore, the transmission success rate of transmitting data and/or feedback information between the terminal devices can be improved.

In an exemplary embodiment, when the first terminal device does not obtain the slot format used by the second terminal device to transmit data and/or feedback information, the first terminal device may preferentially use the first slot format to transmit data and/or feedback information in the first slot.

Optionally, a reason that the first terminal device does not obtain the slot format used by the second terminal device to transmit data and/or feedback information may be that the second terminal device communicating with the first terminal device is not within a communication range (that is, not within a specific distance).

Figure 14:
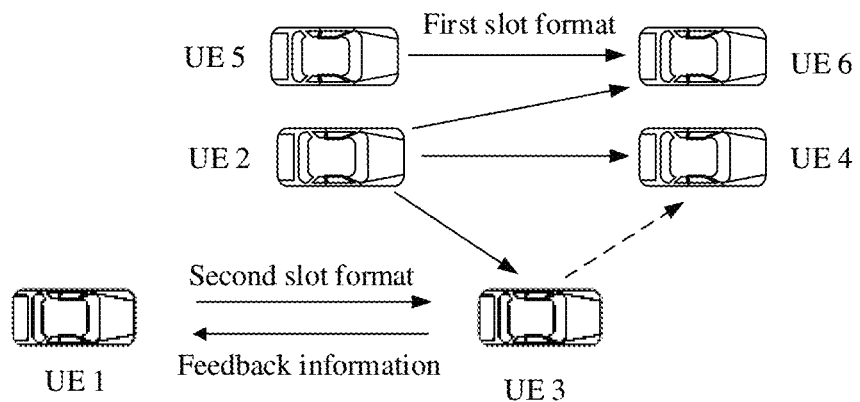
FIG. 14 is still another schematic diagram of communication between terminal devices according to an embodiment.

For example, as shown in FIG. 14, UE 5 sends data and/or feedback information to UE 6. Because the UE 5 is not within an effective range of UE 1, when the UE 5 sends data, a slot format used by the UE 1 to transmit data and/or feedback information does not need to be considered. If the UE 5 does not obtain the second slot format used by another second terminal device to send data and/or feedback information, the UE 5 preferentially uses the first slot format to send data in the first slot.

An exemplary embodiment further provides another embodiment of a transmission resource determining method.

Optionally, without violating a network configuration, a first terminal device may configure a first slot format or a second slot format for use, and configure a periodicity or a repeated sending time interval of the used slot format. When determining a slot format for transmitting data and/or transmitting feedback information in a first slot, the first terminal device does not need to consider a slot format used by another second terminal device to transmit data and/or transmit feedback information. The slot format configured by the first terminal device is preferentially used to transmit data and/or feedback information.

An exemplary embodiment further provides still another embodiment of a transmission resource determining method.

Optionally, without violating a network configuration, a first terminal device may receive a slot format that is in a plurality of slots and that is configured by a network device for the first terminal device, that is, whether the slot format used by the first terminal device in the plurality of slots is a first slot format or a second slot format.

Optionally, the first terminal device may alternatively obtain, by broadcasting by the network device, a slot format corresponding to the first terminal device in the plurality of slots, that is, whether the slot format used by the first terminal device in the plurality of slots is a first slot format or a second slot format.

For example, a base station may configure, for the first terminal device, slot format information for transmitting data and/or transmitting feedback information. For example, the base station may indicate, in a bitmap, a slot format used by the first terminal device to transmit data and/or feedback information. For example, the base station may use 1 to identify a self-contained slot format, use 0 to identify a normal slot format, and may use 8 bits to indicate slot formats. For example, 10110000 may be understood as slot formats used for communication of eight sidelinks, where the first slot, the third slot, and the fourth slot are self-contained slot formats, and the second slot, the fifth slot, the sixth slot, the seventh slot, and the eighth slot are normal slot formats. This is not limited herein.

For example, the base station may further configure a format of each symbol in the second slot format. For example, the base station may use S to identify a symbol used for sidelink transmission in the slot, and use X to identify a gap. For example, for a slot including 14 symbols, SSSSSSSSSSSXSS is used to identify that the first 11 symbols are sidelink transmission symbols, the twelfth symbol is a gap symbol, and the thirteenth symbol and the fourteenth symbol are sidelink transmission symbols. On a transmitter terminal device side, an AGC symbol is not distinguished from a sending symbol. Therefore, the first symbol is identified by S.

Optionally, when sidelink communication is performed between the first terminal device and another terminal device, because a priority of information sent by the first terminal device is higher than a priority of information sent by another second terminal device, a slot format corresponding to the first terminal device in the first slot may use the slot format configured by the network device for the first terminal device without referring to a slot format corresponding to the another second terminal device in the first slot.

Figure 15:
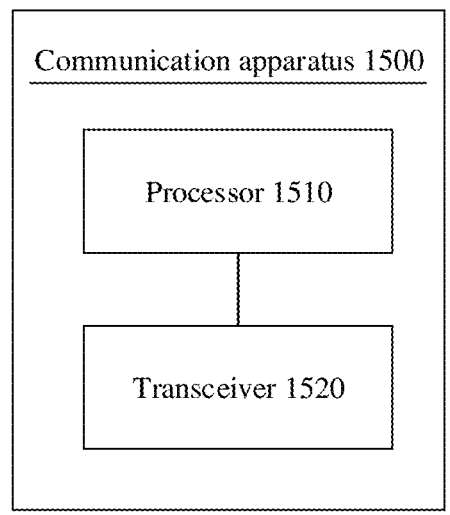
FIG. 15 is a schematic diagram of a structure of a communication apparatus according to an embodiment.

FIG. 15 is a schematic diagram of a structure of a communication apparatus according to an embodiment. The apparatus 1500 may include:

a processor 1510 and a transceiver 1520.

Optionally, the transceiver 1520 is configured to obtain a slot format corresponding to at least one other terminal device in a first slot, and the slot format includes a first slot format and a second slot format: a second terminal device is any one of the at least one other terminal device, and the first slot format corresponding to the second terminal device in the first slot includes: all of symbols that can be used for transmission in the first slot are used by the second terminal device to send information: the second slot format corresponding to the second terminal device in the first slot includes: P symbols in the symbols that can be used for transmission in the first slot are used by the second terminal device to send information, N symbols are used by the second terminal device to receive information, $8 \leq P \leq 11$, $1 \leq N \leq 2$, and P and N are both positive integers.

Optionally, the processor 1510 is configured to determine, based on the slot format corresponding to the at least one other terminal device in the first slot, a slot format corresponding to the first terminal device in the first slot.

Optionally, when the slot format corresponding to the at least one other terminal device in the first slot includes the second slot format, and the apparatus needs to send information, the processor 1510 is further configured to determine that the slot format corresponding to the first terminal device in the first slot is the second slot format, where P symbols in symbols that can be used for transmission in the second slot format are used by the first terminal device to send information, and N symbols are used by the first terminal device to send feedback information or receive feedback information.

Optionally, when the slot format corresponding to the at least one other terminal device in the first slot includes only the first slot format, and the first terminal device needs to send information, the processor 1510 is further configured to determine that the slot format corresponding to the first terminal device in the first slot is the first slot format, where all of symbols that can be used for transmission in the first slot format are used by the first terminal device to send information.

Optionally, when the slot format corresponding to the at least one other terminal device in the first slot includes the first slot format and the second slot format, and the first terminal device needs to receive information, the processor 1510 is further configured to determine a priority of receiving feedback information and a priority of receiving data: and when the priority of receiving feedback information is higher than the priority of receiving data, the processor 1510 is further configured to determine that the slot format corresponding to the first terminal device in the first slot is the second slot format, where P symbols in symbols that can be used for transmission in the second slot format are used by the first terminal device to receive data, and N symbols are used by the first terminal device to send feedback information.

Optionally, when the priority of receiving information in the first slot format is not higher than the priority of receiving information in the second slot format, the processor 1510 is further configured to determine that the slot format corresponding to the first terminal device in the first slot is the second slot format, where the P symbols in the symbols that can be used for transmission in the second slot format are used by the first terminal device to receive data, and the N symbols are used by the first terminal device to send feedback information.

Optionally, when the priority of receiving information in the first slot format is higher than the priority of receiving information in the second slot format, the processor 1510 is further configured to determine that the slot format corresponding to the first terminal device in the first slot is the first slot format, where all of symbols that can be used for transmission in the first slot format are used by the second terminal device to receive information, or P symbols in symbols that can be used for transmission are used by the first terminal device to receive data, and N symbols are used by the first terminal device to receive feedback information.

Optionally, that the transceiver 1520 is further configured to obtain a slot format corresponding to at least one other terminal device in a first slot includes: the transceiver 1520 is configured to detect, in a second slot, SCI sent by each of the at least one other terminal device, where the SCI is used to indicate a slot format corresponding to the at least one other terminal device in the second slot, and the second slot is earlier than the first slot: and/or the transceiver 1520 is further configured to receive configuration information sent by a base station, where the configuration information is used to indicate the slot format corresponding to the at least one other terminal device in the first slot.

Optionally, the SCI may include resource reservation information, where the resource reservation information is used to indicate the slot format used by the at least one other terminal device in the first slot.

Optionally, the SCI may further include information about a repeated transmission time interval. The first terminal device determines, based on information about the repeated transmission time interval, a time interval at which the at least one other terminal device continuously repeatedly transmits data in the first slot by using the slot format the same as that in the second slot.

Optionally, the SCI may further include feedback information symbol indication information, where the feedback information symbol indication information is used to indicate a symbol for sending feedback information.

It should be understood that the communication apparatus in FIG. 15 may be a terminal device.

The communication apparatus 1500 provided in an exemplary embodiment may correspond to a process performed by the terminal device in the foregoing method embodiments in FIG. 11 and FIG. 12. For functions of the processor and the transceiver in the communication apparatus, refer to the foregoing descriptions. Detailed descriptions are appropriately omitted herein.

An embodiment further provides a storage medium. The storage medium stores a computer program or instructions. When the computer program is executed or the instructions are executed, a computer is enabled to perform the method in the foregoing method embodiments.

An embodiment further provides a communication apparatus. The apparatus includes a processor and a memory, where the processor reads and executes instructions in the memory, to implement the method in the foregoing method embodiments. An embodiment further provides a communication system. The communication system includes an apparatus for implementing the method in the foregoing method embodiments.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

In an exemplary embodiment, the term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects.

"Predefine" in the embodiments may be understood as "define", "predefine", "store", "prestore", "pre-negotiate", "preconfigure", "solidify", or "pre-burn".

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided herein, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions essentially, or the part contributing to a current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory, a random access memory, a magnetic disk, or an optical disc.

The foregoing descriptions are merely exemplary implementations, but are not intended to limit the protection scope. Any variation or replacement readily figured out by a person skilled in the art within the technical scope disclosed herein shall fall within the protection scope. Therefore, the protection scope shall be subject to the protection scope of the claims.

What is claimed is:

1. A method, comprising:
    obtaining, by a first terminal device, a slot format corresponding to at least one other terminal device in a first slot, wherein the slot format comprises a first slot format and a second slot format;
    a second terminal device is any one of the at least one other terminal device, and the first slot format corresponding to the second terminal device in the first slot comprises: all of symbols that can be used for transmission in the first slot are used by the second terminal device to send information; the second slot format corresponding to the second terminal device in the first slot comprises: P symbols in the symbols that can be used for transmission in the first slot are used by the second terminal device to send information, N symbols are used by the second terminal device to receive information, $8 \leq P \leq 11$, $1 \leq N \leq 2$, and P and N are both positive integers; and
    determining, by the first terminal device based on the slot format corresponding to the at least one other terminal device in the first slot, a slot format corresponding to the first terminal device in the first slot.

2. The method according to claim 1, wherein the determining, by the first terminal device based on the slot format corresponding to the at least one other terminal device in the first slot, the slot format corresponding to the first terminal device in the first slot comprises:
    determining that the slot format corresponding to the first terminal device in the first slot is the second slot format, wherein the P symbols in the symbols that can be used for transmission in the second slot format are used by the first terminal device to send information, and the N symbols are used by the first terminal device to receive feedback information, when the slot format corresponding to the at least one other terminal device in the first slot comprises the second slot format, and the first terminal device needs to send information.

3. The method according to claim 1, wherein the determining, by the first terminal device based on the slot format corresponding to the at least one other terminal device in the first slot, the slot format corresponding to the first terminal device in the first slot comprises:
    determining that the slot format corresponding to the first terminal device in the first slot is the first slot format, wherein all of symbols that can be used for transmission in the first slot format are used by the first terminal device to send information, when the slot format corresponding to the at least one other terminal device in the first slot comprises only the first slot format, and the first terminal device needs to send information.

4. The method according to claim 1, wherein the determining, by the first terminal device based on the slot format corresponding to the at least one other terminal device in the first slot, the slot format corresponding to the first terminal device in the first slot comprises:
    determining, by the first terminal device, a priority of receiving feedback information and a priority of receiving data, when the slot format corresponding to the at least one other terminal device in the first slot comprises the first slot format and the second slot format, and the first terminal device needs to receive information; and
    determining that the slot format corresponding to the first terminal device in the first slot is the second slot format, wherein the P symbols in the symbols that can be used for transmission in the second slot format are used by the first terminal device to receive data, and the N symbols are used by the first terminal device to send feedback information, when the priority of receiving feedback information is higher than the priority of receiving data.

5. The method according to claim 4, wherein the determining, by the first terminal device based on the slot format corresponding to the at least one other terminal device in the first slot, the slot format corresponding to the first terminal device in the first slot comprises:
    determining, by the first terminal device, that the slot format corresponding to the first terminal device in the first slot is the second slot format, wherein the P symbols in the symbols that can be used for transmission in the second slot format are used by the first terminal device to receive data, and the N symbols are used by the first terminal device to send feedback information, when the priority of receiving information in the first slot format is not higher than the priority of receiving information in the second slot format; or
    determining, by the first terminal device, that the slot format corresponding to the first terminal device in the first slot is the first slot format, wherein all of symbols that can be used for transmission in the first slot format are used by the second terminal device to receive information, or the P symbols in symbols that can be used for transmission are used by the first terminal device to receive data, and the N symbols are used by the first terminal device to receive feedback information, when the priority of receiving information in the first slot format is higher than the priority of receiving information in the second slot format.

6. The method according to claim 1, wherein the obtaining, by the first terminal device, the slot format corresponding to the at least one other terminal device in the first slot comprises:
    detecting, by the first terminal device in the second slot, sidelink control information sent by each of the at least one other terminal device, wherein the sidelink control information is used to indicate the slot format corresponding to the at least one other terminal device in the second slot, and the second slot is earlier than the first slot; and/or
    receiving, by the first terminal device, configuration information sent by a base station, wherein the configuration information is used to indicate the slot format corresponding to the at least one other terminal device in the first slot.

7. The method according to claim 6, wherein the sidelink control information comprises:
    resource reservation information, wherein the resource reservation information is used to indicate the slot format used by the at least one other terminal device in the first slot; or
    information about a repeated transmission time interval, wherein the first terminal device determines, based on information about the repeated transmission time interval, a time interval at which the at least one other terminal device continuously and repeatedly transmits data in the first slot by using the slot format the same as that in the second slot.

8. The method according to claim 6, wherein the sidelink control information further comprises:
    feedback information symbol indication information, wherein the feedback information symbol indication information is used to indicate a symbol for sending feedback information.

9. An apparatus, wherein the apparatus comprises:
a memory storage comprising instructions; and
one or more processors in communication with the memory storage, wherein the execution of the instructions by the one or more processors causes the apparatus to:
obtain a slot format corresponding to at least one other terminal device in a first slot, and the slot format comprises a first slot format and a second slot format; a second terminal device is any one of the at least one other terminal device, and the first slot format corresponding to the second terminal device in the first slot comprises: all of symbols that can be used for transmission in the first slot are used by the second terminal device to send information; the second slot format corresponding to the second terminal device in the first slot comprises: P symbols in the symbols that can be used for transmission in the first slot are used by the second terminal device to send information, N symbols are used by the second terminal device to receive information, $10 \leq P \leq 11$, $1 \leq N \leq 2$, and P and N are both positive integers; and
determine, based on the slot format corresponding to the at least one other terminal device in the first slot, a slot format corresponding to the apparatus in the first slot.

10. The apparatus according to claim 9, wherein the execution of the instructions by the one or more processors further causes the apparatus to:
determine that the slot format corresponding to the apparatus in the first slot is the second slot format, wherein the P symbols in the symbols that can be used for transmission in the second slot format are used by the apparatus to send information, and the N symbols are used by the apparatus to receive feedback information, when the slot format corresponding to the at least one other terminal device in the first slot comprises the second slot format, and the apparatus needs to send information.

11. The apparatus according to claim 9, wherein the execution of the instructions by the one or more processors further causes the apparatus to:
determine that the slot format corresponding to the apparatus in the first slot is the first slot format, wherein all of symbols that can be used for transmission in the first slot format are used by the apparatus to send information, when the slot format corresponding to the at least one other terminal device in the first slot comprises only the first slot format, and the apparatus needs to send information.

12. The apparatus according to claim 9, wherein the execution of the instructions by the one or more processors specially causes the apparatus to:
determine a priority of receiving feedback information and a priority of receiving data, when the slot format corresponding to the at least one other terminal device in the first slot comprises the first slot format and the second slot format, and the apparatus needs to receive information; and
determine that the slot format corresponding to the apparatus in the first slot is the second slot format, wherein the P symbols in symbols that can be used for transmission in the second slot format are used by the apparatus to receive data, and the N symbols are used by the apparatus to send feedback information, when the priority of receiving feedback information is higher than the priority of receiving data.

13. The apparatus according to claim 12, wherein the execution of the instructions by the one or more processors specially causes the apparatus to:
determine that the slot format corresponding to the apparatus in the first slot is the second slot format, wherein the P symbols in the symbols that can be used for transmission in the second slot format are used by the apparatus to receive data, and the N symbols are used by the apparatus to send feedback information, when the priority of receiving information in the first slot format is not higher than the priority of receiving information in the second slot format; or
determine that the slot format corresponding to the apparatus in the first slot is the first slot format, wherein all of symbols that can be used for transmission in the first slot format are used by the apparatus to receive information, or the P symbols in symbols that can be used for transmission are used by the apparatus to receive data, and the N symbols are used by the apparatus to receive feedback information, when the priority of receiving information in the first slot format is higher than the priority of receiving information in the second slot format.

14. The apparatus according to claim 9, wherein the execution of the instructions by the one or more processors specially causes the apparatus to:
detect sidelink control information sent by each of the at least one other terminal device, wherein the sidelink control information is used to indicate the slot format corresponding to the at least one other terminal device in the second slot, and the second slot is earlier than the first slot; and/or
receive configuration information sent by a base station, wherein the configuration information is used to indicate the slot format corresponding to the at least one other terminal device in the first slot.

15. The apparatus according to claim 14, wherein the sidelink control information comprises:
resource reservation information, wherein the resource reservation information is used to indicate the slot format used by the at least one other terminal device in the first slot; or
information about a repeated transmission time interval, wherein the processor determines, based on information about the repeated transmission time interval, a time interval at which the at least one other terminal device continuously and repeatedly transmits data in the first slot by using the slot format the same as that in the second slot.

16. The apparatus according to claim 14, wherein the sidelink control information further comprises:
feedback information symbol indication information, wherein the feedback information symbol indication information is used to indicate a symbol for sending feedback information.

* * * * *